US010129683B2

(12) United States Patent
Arrasvuori et al.

(10) Patent No.: US 10,129,683 B2
(45) Date of Patent: Nov. 13, 2018

(54) CONTROLLING AUDIO SIGNAL PARAMETERS FOR CAPTURE AND MIXING OF SPATIAL AUDIO DATA

(71) Applicant: Nokia Technologies Oy, Espoo (FI)

(72) Inventors: Juha Arrasvuori, Tampere (FI); Antti Eronen, Tampere (FI); Arto Lehtiniemi, Lempäälä (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/627,812

(22) Filed: Jun. 20, 2017

(65) Prior Publication Data
US 2018/0007491 A1    Jan. 4, 2018

(30) Foreign Application Priority Data
Jun. 30, 2016 (EP) .................... 16177185

(51) Int. Cl.
| H04S 7/00 | (2006.01) |
| G10L 19/008 | (2013.01) |
| G01S 3/808 | (2006.01) |
| G06F 3/16 | (2006.01) |
| H04M 3/56 | (2006.01) |

(52) U.S. Cl.
CPC ............ *H04S 7/304* (2013.01); *G01S 3/8083* (2013.01); *G06F 3/165* (2013.01); *G10L 19/008* (2013.01); *H04M 3/568* (2013.01); *H04S 7/306* (2013.01); *H04R 2499/15* (2013.01); *H04S 7/40* (2013.01); *H04S 2400/11* (2013.01); *H04S 2400/13* (2013.01); *H04S 2400/15* (2013.01)

(58) Field of Classification Search
CPC ..... G01S 3/8083; G06F 3/165; G10L 19/008; H04M 3/568; H04S 7/304; H04S 7/306; H04S 7/40; H04S 2400/11
See application file for complete search history.

(56) References Cited

U.S. PATENT DOCUMENTS

| 2009/0098860 | A1* | 4/2009 | Wasserman | ............ G01C 21/20 455/414.1 |
| 2014/0189510 | A1 | 7/2014 | Ozcan | |
| 2015/0149173 | A1 | 5/2015 | Korycki | |
| 2015/0269929 | A1* | 9/2015 | Emery | .................... G10L 15/30 704/254 |

(Continued)

FOREIGN PATENT DOCUMENTS

WO    2013/144417 A1    10/2013

OTHER PUBLICATIONS

Shah et al., "Metrics for Measuring Ideation Effectiveness", Design Studies, vol. 24, No. 2, Mar. 2003, pp. 111-134.

(Continued)

*Primary Examiner* — Mark Fischer
(74) *Attorney, Agent, or Firm* — Harrington & Smith

(57) ABSTRACT

A method and corresponding system for correcting for deviations in a performance that includes a plurality of audio sources, the method comprising detecting a parameter relating to an audio source, determining if the parameter deviates from a predetermined characteristic and in response to it being determined that the parameter deviates from the predetermined characteristic, causing display of a user interface configured to control the parameter, to allow a user to correct the deviation.

18 Claims, 14 Drawing Sheets

(56) References Cited

U.S. PATENT DOCUMENTS

2016/0026371 A1* 1/2016 Lu .................. G06F 3/04845
715/765

OTHER PUBLICATIONS

Smith., "Idea-Generation Techniques: A Formulary of Active Ingredients", Journal of creative behavior, vol. 32, No. 2, Jun. 1998, pp. 107-133.
Smith, "Towards a logic of innovation", The International Handbook on Innovation, Dec. 2003. p. 347-365.
Extended European Search Report received for corresponding European Patent Application No. 16177185.2, dated Dec. 13, 2016, 7 pages.

* cited by examiner

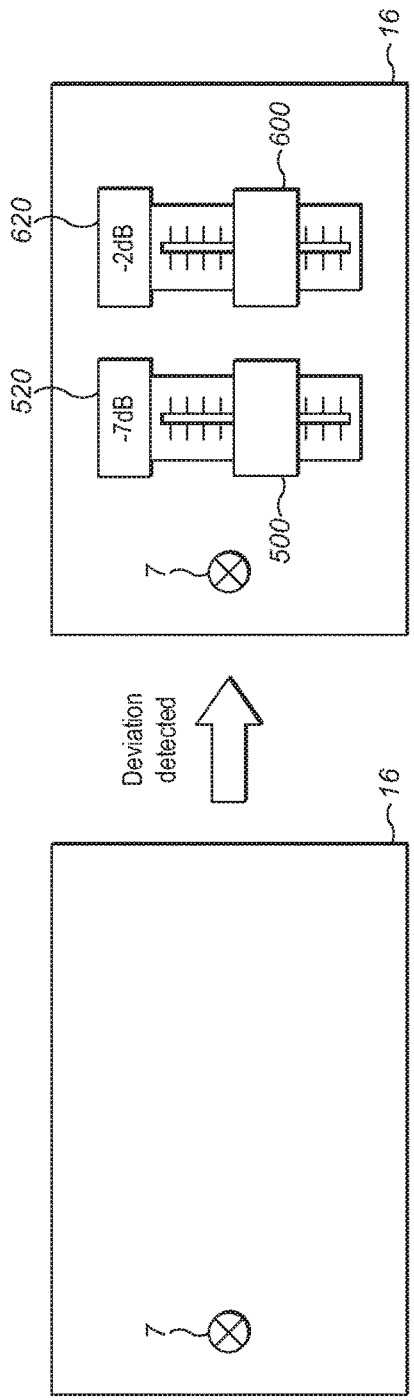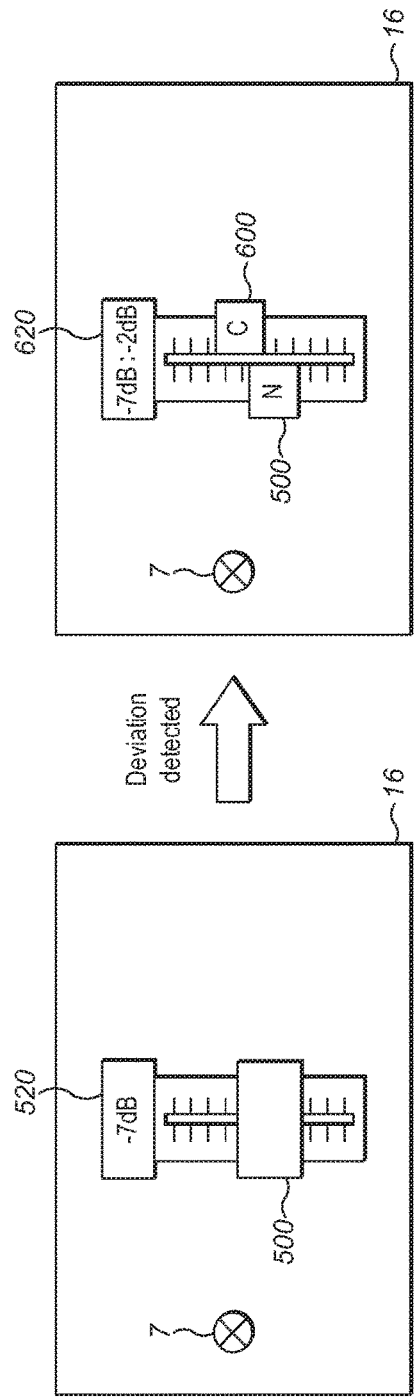

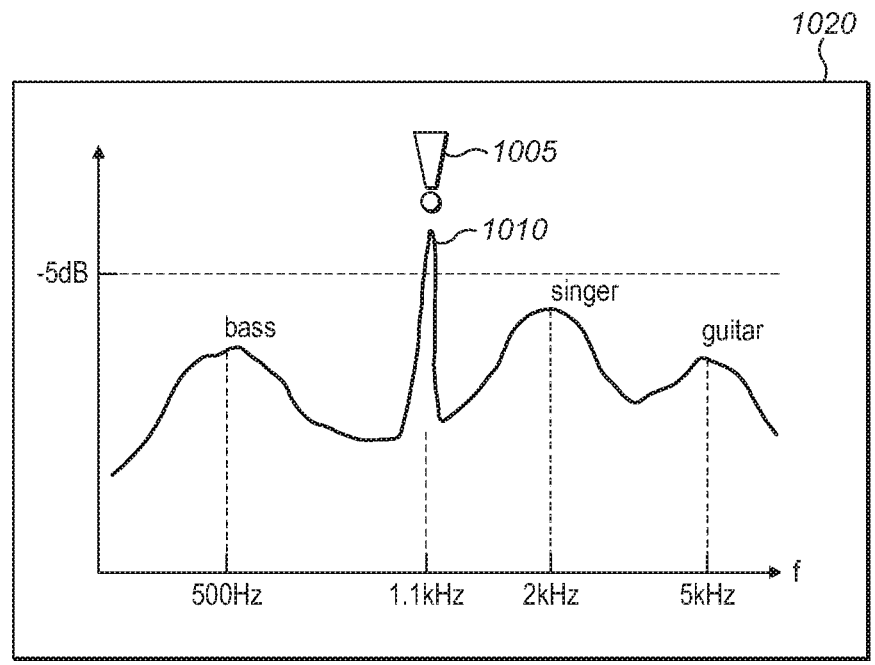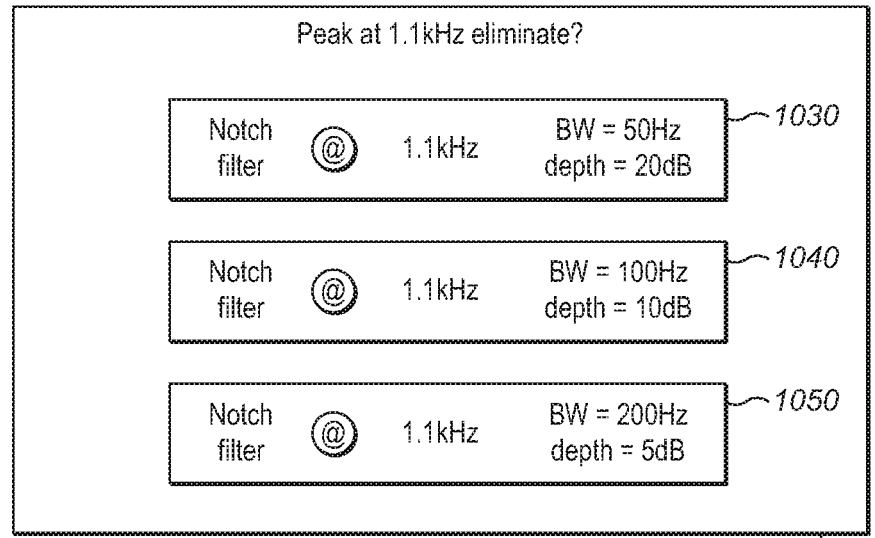
FIG. 10

CONTROLLING AUDIO SIGNAL PARAMETERS FOR CAPTURE AND MIXING OF SPATIAL AUDIO DATA

FIELD

This disclosure relates to controlling audio signal parameters in the field of spatial audio and virtual reality (VR). Particularly but not exclusively, the disclosure further relates to systems and user interfaces for spatial audio mixing.

BACKGROUND

Spatial audio refers to playable audio data that exploits sound localisation. In a real world space, for example in a concert hall, there will be multiple audio sources, for example the different members of an orchestra or band, positioned at different locations on the stage. The location and movement of the audio sources are parameters of the captured audio. In rendering the audio as spatial audio for playback, such parameters may be incorporated in the data using processing algorithms so that the listener is provided with an immersive and spatially oriented experience.

An example application of spatial audio is in virtual reality (VR) whereby both video and audio data is captured within a real world space. In the rendered version of the space, i.e. the virtual space, the user, through a VR headset, can view and listen to the captured video and audio which has a spatial percept.

SUMMARY

In a first aspect, this specification describes a method comprising detecting a parameter relating to an audio source, determining if the parameter deviates from a predetermined characteristic and, in response to it being determined that the parameter deviates from the predetermined characteristic, causing display of a user interface configured to control the parameter.

The spatial location of the audio source may be caused to be displayed on a display, the method further comprising causing display of the user interface on the display in association with the audio source.

Determining if the parameter deviates from the predetermined characteristic may comprise determining if a level associated with the parameter falls outside a predetermined range.

Determining if the parameter deviates from the predetermined characteristic may comprise determining the presence of an unwanted signal associated with the audio source, the unwanted signal falling outside the predetermined range associated with the parameter.

Determining if the parameter deviates from the predetermined characteristic may comprise determining if a difference is detected between text corresponding to a captured audio signal and a predetermined script.

Determining if the parameter deviates from the predetermined characteristic may comprise determining if a difference is detected between the captured audio signal and an audio signal corresponding to a predetermined script.

The user interface may comprise a control interface having first and second parts, the first part comprising a first control element for controlling a desired parameter level and the second part comprising a second control element for controlling the parameter when the parameter deviates from the predetermined characteristic.

The method may comprise causing display of the first control element in response to a receipt of a signal indicative of a user interaction on a screen that displays the audio source and causing display of the second control element only in response to the parameter deviating from the predetermined characteristic.

The method may further comprise causing display of an indicator adjacent to the audio source, the indicator being arranged to indicate that the parameter relating to the audio source deviates from the predetermined characteristic.

The method may comprise varying the size of the indicator in dependence on the amount of the deviation.

The method may further comprise zooming into an audio source having a parameter that deviates from the predetermined characteristic.

The method may further comprise, in response to it being determined that the parameter deviates from the predetermined characteristic, determining the type of deviation and generating a user interface that corresponds to the determined deviation type.

The method may further comprise, in response to determining that a location of the audio source deviates from a predetermined range of locations, generating a controller arranged to control the audio source.

Controlling the audio source may comprise one of silencing the audio source and removing the directionality of the audio source.

The method may comprise determining whether movement of the audio source falls outside a permitted range of movement within a predetermined time period.

The method may comprise determining the location of the audio source using a High Accuracy Indoor Positioning HAIP signal.

The method may comprise determining the noise in the HAIP signal and using the user interface to at least one of smooth the signal and fix the position of the audio source at a desired position.

The method may further comprise, in response to it being determined that the parameter deviates from the predetermined characteristic, determining the spatial location of the audio source and generating the user interface adjacent to the determined spatial location of the audio source within the display.

The parameter may comprise at least one of volume, pitch, fluctuation level of pitch of an audio signal from the audio source, location of the audio source, the presence of feedback or level of background noise in an audio signal from the audio source, dialogue, script and musical phrase.

The method may comprise detecting a plurality of parameters relating to one or more audio sources and determining if more than one of the plurality of parameters deviates from predetermined characteristics and in response to it being determined that more than one of the plurality of parameters deviates from the predetermined characteristic, causing display of the parameters in order of a predetermined priority.

The method may further comprise generating the user interface for a parameter selected from the displayed parameters.

The method may further comprise generating user interfaces for each of the displayed parameters.

The method may further comprise comparing a pre-recorded audio signal with a received signal, and in response to a deviation between the pre-recorded signal and the received signal, causing notification regarding the deviation.

The method may comprise causing display of the user interface to replace the received signal with the pre-recorded signal.

The method may comprise predicting a deviation of the parameter, and in response to predicting the deviation, causing display of the user interface.

The method may comprise predicting a deviation of the parameter, and in response to predicting the deviation, requesting a user input as to whether to display the user interface.

In a second aspect, this specification describes apparatus configured to perform any method described with reference to the first aspect.

The apparatus may comprise a VR capture device for capturing audio from a plurality of audio sources.

The apparatus may comprise a touch screen for displaying a plurality of audio sources and for accepting user input in relation to each of the audio sources.

In a third aspect, this specification describes a computer program comprising instructions that when executed by computer apparatus causes the computer apparatus to perform any method described with reference to the first aspect.

In a fourth aspect, this specification describes apparatus comprising means for detecting a parameter relating to an audio source, means for determining if the parameter deviates from a predetermined characteristic and means for causing display of a user interface configured to control the parameter, the user interface being caused to be displayed in response to it being determined that the parameter deviates from the predetermined characteristic. The apparatus of the fourth aspect may further comprise means for causing performance of any of the operations described with reference to the method of the first aspect.

In a fifth aspect, this specification describes apparatus comprising at least one processor, and at least one memory including computer program code, which when executed by the at least one processor, causes the apparatus to detect a parameter relating to an audio source, to determine if the parameter deviates from a predetermined characteristic and in response to it being determined that the parameter deviates from the predetermined characteristic, to display a user interface configured to control the parameter.

The computer program code, when executed by the at least one processor, may cause the apparatus to display the spatial location of the audio source on a display, and to display the user interface on the display in association with the audio source.

The computer program code, when executed by the at least one processor, may cause the apparatus to determine if the parameter deviates from the predetermined characteristic by determining if a level associated with the parameter falls outside a predetermined range.

The computer program code, when executed by the at least one processor, may cause the apparatus to determine if the parameter deviates from the predetermined characteristic by determining the presence of an unwanted signal associated with the audio source, the unwanted signal falling outside the predetermined range associated with the parameter.

The computer program code, when executed by the at least one processor, may cause the apparatus to determine if the parameter deviates from the predetermined characteristic by determining if a difference is detected between text corresponding to a captured audio signal and a predetermined script.

The computer program code, when executed by the at least one processor, may cause the apparatus to determine if the parameter deviates from the predetermined characteristic by determining if a difference is detected between the captured audio signal and an audio signal corresponding to a predetermined script.

The user interface may comprise a control interface having first and second parts, the first part comprising a first control element for controlling a desired parameter level and the second part comprising a second control element for controlling the parameter when the parameter deviates from the predetermined characteristic. The computer program code, when executed by the at least one processor, may cause the apparatus to display the first control element in response to a user interaction on a screen that displays the audio source and to display the second control element only in response to the parameter deviating from the predetermined characteristic.

The computer program code, when executed by the at least one processor, may cause the apparatus to display an indicator adjacent to the audio source, the indicator being arranged to indicate that the parameter relating to the audio source deviates from the predetermined characteristic. The computer program code, when executed by the at least one processor, may cause the apparatus to vary the size of the indicator in dependence on the amount of the deviation.

The computer program code, when executed by the at least one processor, may cause the apparatus to zoom into an audio source having a parameter that deviates from the predetermined characteristic.

The computer program code, when executed by the at least one processor, may cause the apparatus, in response to it being determined that the parameter deviates from the predetermined characteristic, to determine the type of deviation and generating a user interface that corresponds to the determined deviation type.

The computer program code, when executed by the at least one processor, may cause the apparatus, in response to determining that a location of the audio source deviates from a predetermined range of locations, to generating a controller arranged to control the audio source. Controlling the audio source may comprise one of silencing the audio source and removing the directionality of the audio source.

The computer program code, when executed by the at least one processor, may cause the apparatus to determine whether movement of the audio source falls outside a permitted range of movement within a predetermined time period.

The computer program code, when executed by the at least one processor, may cause the apparatus to determine the location of the audio source using a High Accuracy Indoor Positioning HAIP signal. The computer program code, when executed by the at least one processor, may cause the apparatus to determine the noise in the HAIP signal and to use the user interface to at least one of smooth the signal and fix the position of the audio source at a desired position.

The computer program code, when executed by the at least one processor, may cause the apparatus, in response to it being determined that the parameter deviates from the predetermined characteristic, to determine the spatial location of the audio source and to generate the user interface adjacent to the determined spatial location of the audio source within the display.

The parameter may comprise at least one of volume, pitch, fluctuation level of pitch of an audio signal from the audio source, location of the audio source, the presence of feedback or level of background noise in an audio signal from the audio source, dialogue, script and musical phrase.

The computer program code, when executed by the at least one processor, may cause the apparatus to detect a plurality of parameters relating to one or more audio sources and to determine if more than one of the plurality of parameters deviates from predetermined characteristics and, in response to it being determined that more than one of the plurality of parameters deviates from the predetermined characteristic, to display the parameters in order of a predetermined priority.

The computer program code, when executed by the at least one processor, may cause the apparatus to generate the user interface for a parameter selected from the displayed parameters. The computer program code, when executed by the at least one processor, may cause the apparatus to generate user interfaces for each of the displayed parameters.

The computer program code, when executed by the at least one processor, may cause the apparatus to compare a pre-recorded audio signal with a received signal, and in response to a deviation between the pre-recorded signal and the received signal, to notify the deviation. The computer program code, when executed by the at least one processor, may cause the apparatus to display the user interface to replace the received signal with the pre-recorded signal.

The computer program code, when executed by the at least one processor, may cause the apparatus to predict a deviation of the parameter, and in response to predicting the deviation, cause display of the user interface. The computer program code, when executed by the at least one processor, may cause the apparatus to predict a deviation of the parameter, and in response to predicting the deviation, request a user input as to whether to display the user interface.

In a sixth aspect, this specification describes a computer program product comprising one or more computer-readable medium having computer-readable code stored thereon, the computer-readable code, when executed by at least one processor, causing performance of at least detecting a parameter relating to an audio source, determining if the parameter deviates from a predetermined characteristic and, in response to it being determined that the parameter deviates from the predetermined characteristic, causing display of a user interface configured to control the parameter. The computer-readable code stored on the medium of the sixth aspect may further cause performance of any of the operations described with reference to the method of the first aspect.

BRIEF DESCRIPTION OF THE DRAWINGS

Embodiments will now be described, by way of non-limiting example, with reference to the accompanying drawings, in which:

FIGS. 6a and 6b show graphical representations of a user interface (UI) indicating the locations of an audio source and a controller unit and a correction controller unit generated for the audio source when deviations are detected;

FIG. 10 is a graphical representation of a UI indicating an example of a correction controller unit customised for correcting the presence of an unwanted signal in an audio spectrum;

DETAILED DESCRIPTION OF EMBODIMENTS

Embodiments relate to methods and systems for controlling parameters related to audio sources via user interfaces, in the context of the capture and mixing of spatial audio data for live performance and post processing. In particular, the embodiments relate to capturing and mixing methods in which there are multiple audio sources within a virtual space.

An example application is in a VR capture and rendering system in which video is also captured and rendered to provide an immersive user experience. Nokia's OZO® VR camera is used as an example of a VR capture device, also referred to as a presence capture device, which comprises a microphone array to provide a spatial audio signal, but it will be appreciated that the embodiments are neither limited to VR applications nor the use of microphone arrays at the capture point.

Figure 1:
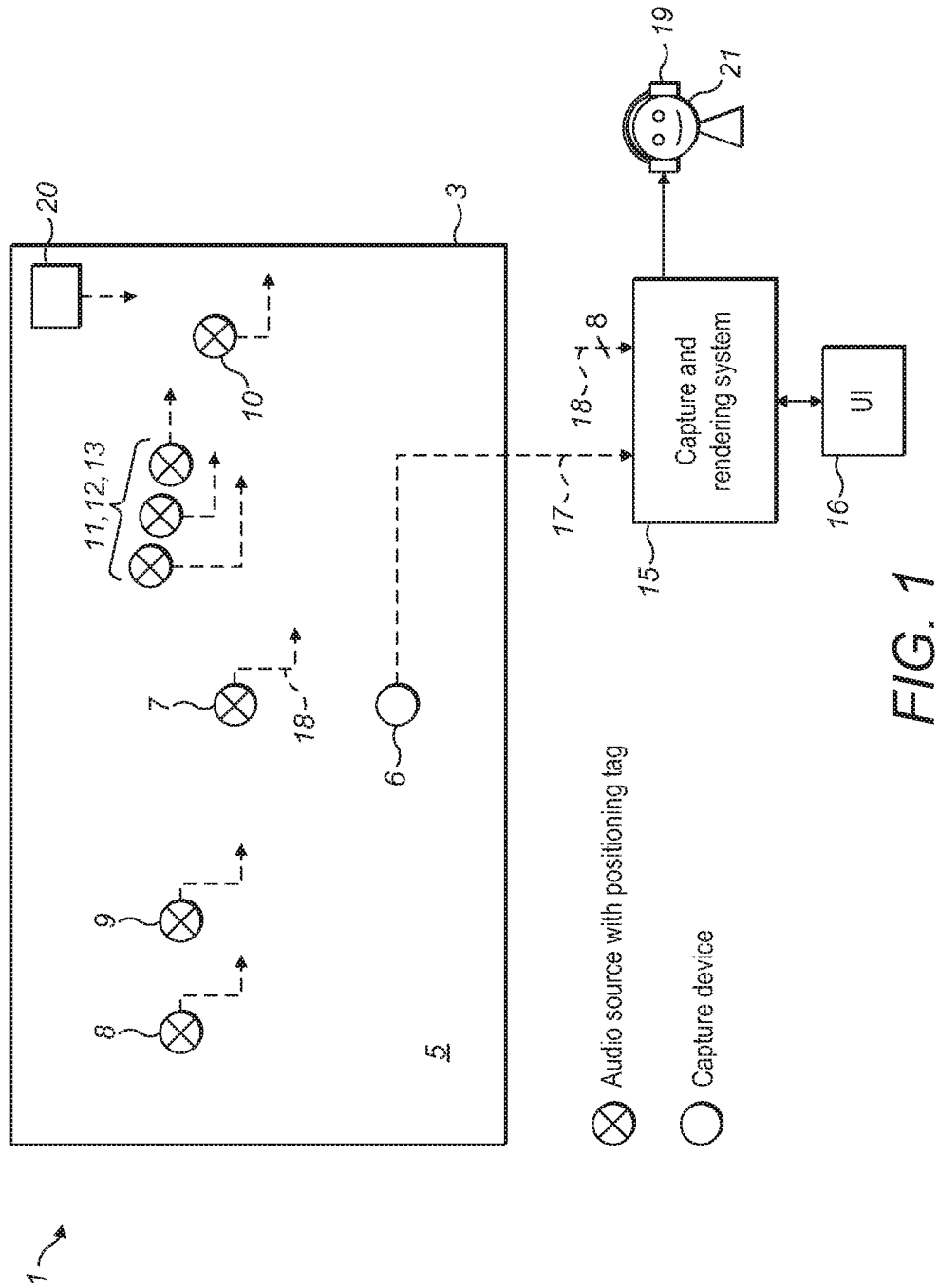
FIG. 1 is a schematic representation of a distributed audio capture scenario.

Referring to FIG. 1, an overview of an audio capture scenario 1 is shown together with a first embodiment of a capture and rendering system (CRS) 15 with associated user interface 16. FIG. 1 schematically illustrates a real world space 3 which may be, for example, a concert hall or other music venue. The CRS 15 is applicable to any real world space, however. A VR device 6, for example, the Nokia OZO® VR camera, for video and spatial audio capture is supported on a floor 5 of the space 3 in front of multiple audio sources, in this case a band; the position of the VR device 6 is known, e.g. through predetermined positional data or signals derived from a positioning tag on the VR device (not shown). The VR device 6 comprises a microphone array configured to provide spatial audio capture. However, embodiments herein are not limited to applications which require the audio and/or video captured by VR device 6.

Individual microphones at the location of each audio source may alternatively or additionally be provided.

The band may comprise multiple members each of whom has an associated external microphone or (in, for example, the case of guitarists) a pick-up feed providing audio signals. Each may therefore be termed an audio source for convenience. In other embodiments, other types of audio source can be used. The audio sources in this case may comprise a lead vocalist 7, a drummer 8, lead guitarist 9, bass guitarist 10, and three members of a choir or backing singers 11, 12, 13 who are spatially close together in a group.

As well as having an associated microphone or audio feed, the audio sources 7-13 may carry a positioning tag which can be any module capable of indicating its respective spatial position to the CRS 15. For example the positioning tag may be a high accuracy indoor positioning (HAIP) tag which works in association with one or more HAIP locators 20 within the space 3. HAIP systems use Bluetooth Low Energy (BLE) communication between the tags and the one or more locators 20. For example, there may be four HAIP locators 20 mounted on, or placed relative to, the VR device 6. A respective HAIP locator may be to the front, left, back and right of the VR device 6. However, depending on the situation of the space 3, a smaller number of HAIP locators may be used. In the example shown in FIG. 1, one HAIP locator 20 is placed in a corner of the space 3. Each tag sends BLE signals from which the HAIP locators derive the tag, and therefore, the audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag can be calculated using geometry.

The CRS 15 is a processing system having an associated user interface (UI) 16 which will be explained in further detail below. As shown in FIG. 1, the CRS 15 receives as input from the capture device 6 spatial video data and/or audio data, and positioning data, through a signal line 17. Alternatively, the positioning data can be received from the HAIP locator 20. The CRS 15 also receives as input from each of the audio sources 7-13 audio data and positioning data from the respective positioning tags, or the HAIP locator 20, through separate signal lines 18. The CRS 15 generates spatial audio data for output to a user device 19, such as a VR headset with video and audio output. A mixing person 21 performs the processes of capture, mix and render for a live performance or for a post processing using the user device 19 and the UI 16.

The input audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input from the OZO VR camera, if used for the capture device 6.

Figure 2:
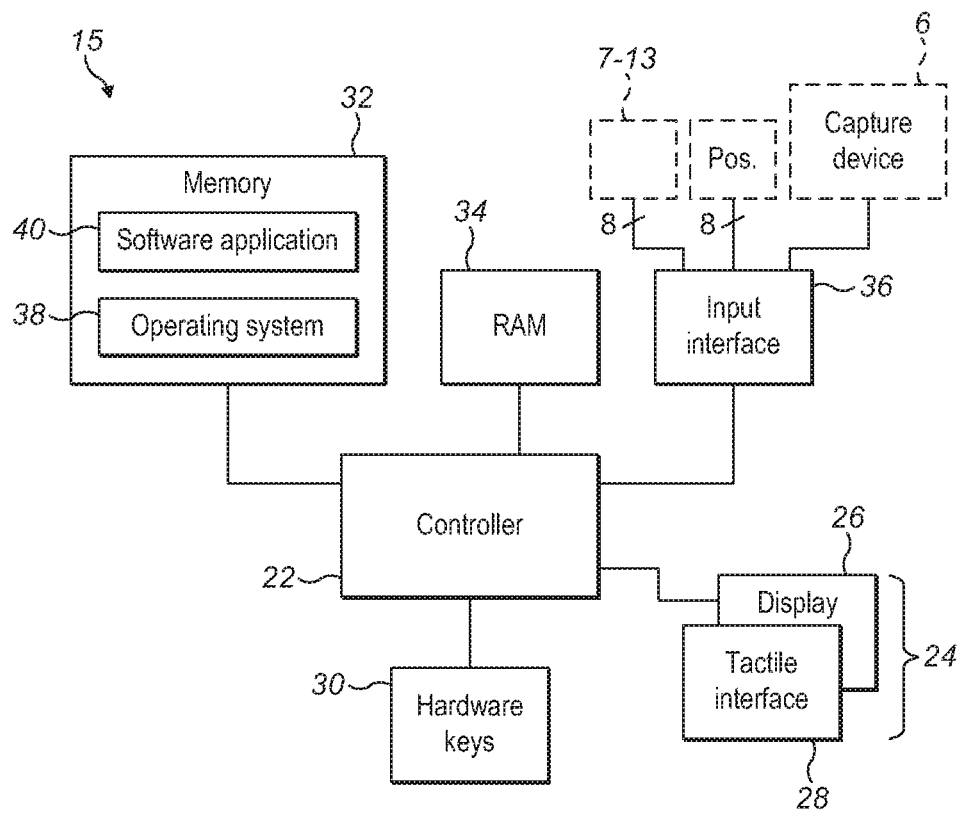
FIG. 2 is a schematic diagram illustrating the components of the Capture and Rendering System (CRS) shown in FIG. 1.

FIG. 2 shows an example schematic diagram of components of the CRS 15. The CRS 15 may include a controller (or control or processing apparatus) 22, a touch sensitive display 24 comprising a display part 26 and a tactile interface part 28, hardware keys 30, a memory 32, RAM 34 and an input interface 36. The controller 22 may be connected to each of the other components in order to control operation thereof. The touch sensitive display 24 is optional, and as an alternative a conventional display may be used with the hardware keys 30 and/or a mouse peripheral used to control the CRS 15 by conventional means.

The memory 32 may be any suitable type (or combination of types) of non-transitory computer-readable memory medium. For instance, the memory 32 may be a non-volatile memory such as read only memory (ROM), a hard disk drive (HDD) or a solid state drive (SSD). The memory 32 stores, amongst other things, an operating system 38 and one or more software applications 40. The RAM 34 is used by the controller 22 for the temporary storage of data. The operating system 38 may contain code which, when executed by the controller 22 in conjunction with RAM 34, controls operation of each of hardware components of the terminal.

The controller 22 may take any suitable form. For instance, it may be a microcontroller, plural microcontrollers, a processor (including dual-core and multiple-core processors), or plural processors.

In embodiments herein, one software application 40 is configured to provide video and distributed spatial audio capture, mixing and rendering to generate a VR environment, or virtual space, including the rendered spatial audio. The software application 40 also provides the UI 16 shown in FIG. 1, through its output to the display 24 and receives user input through the tactile interface 28 or other input peripherals such as the hardware keys 30 or a mouse (not shown). UI 16 may correspond to the video image captured by VR device 6. In this case, the spatial positions of the audio sources 7 to 13 are represented by the image of the performers or the audio source. Alternatively, the UI 16 may correspond to any other possible format which indicates the spatial locations of the audio sources 7 to 13 on a plan view image of the space 3. In this case, the spatial positions of the audio sources 7 to 13 are represented by symbols on a schematic of a plan view of the space 3. The mixing stage may be performed manually through the UI 16 by the mixing person 21 or all or part of the mixing stage may be performed automatically. The software application 40 may render the virtual space, including the spatial audio, using known signal processing techniques and algorithms based on the mixing stage.

The input interface 36 receives video and audio data from the capture device 6, such as Nokia's OZO® device, and audio data from each of the audio sources 7-13. The input interface 36 also receives the positioning data from (or derived from) the positioning tags on each of the capture device 6 and the audio sources 7-13, from which can be made an accurate determination of their respective positions in the real world space 3.

The software application 40 may be configured to operate in any of real-time, near real-time or even offline using pre-stored captured data.

Figure 3:
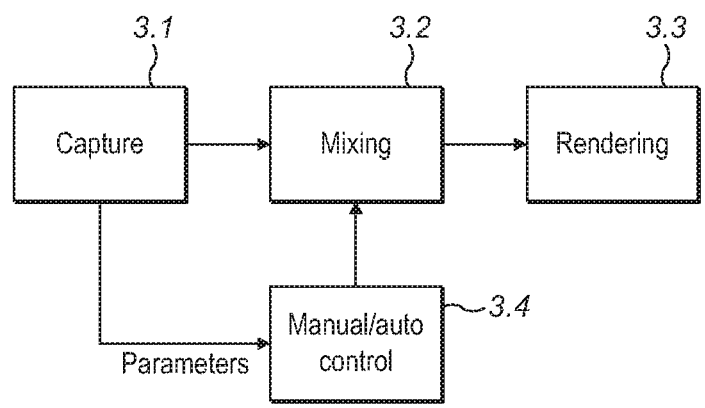
FIG. 3 is a flow diagram showing method steps of audio capture, mixing and rendering according to an embodiment.

FIG. 3 shows an overview flow diagram of the capture, mixing and rendering stages of the software application 40. The mixing and rendering stages may be combined. First, video and audio capture is performed in step 3.1; next mixing is performed in step 3.2, followed by rendering in step 3.3. Mixing (step 3.2) may be dependent on a control step 3.4 which may be based on various parameters of the captured video and/or audio.

For the manual or automatic control step 3.4, the software application 40 may provide a controller unit within the UI 16 to control various parameters relevant to audio signals and performance.

Figure 4A:
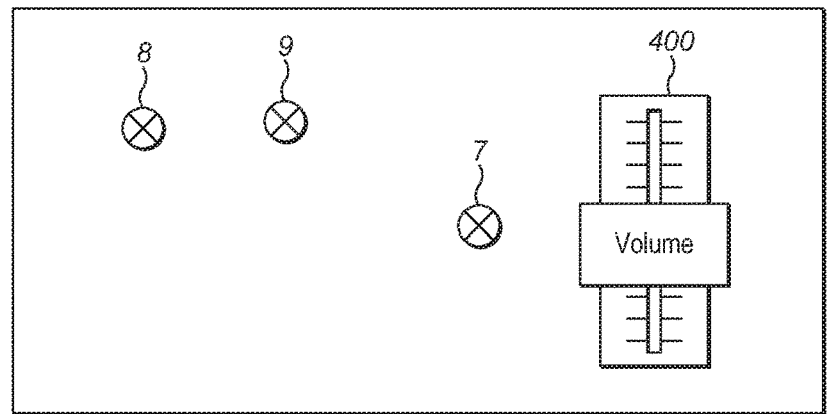
FIGS. 4a to 4c show graphical representations of a user interface (UI) indicating the locations of audio sources and a controller unit generated for one of the audio sources.
Figure 4B:
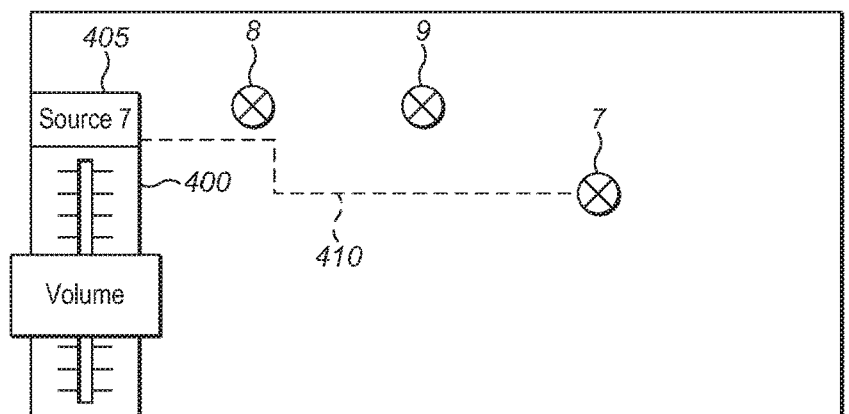
Figure 4C:
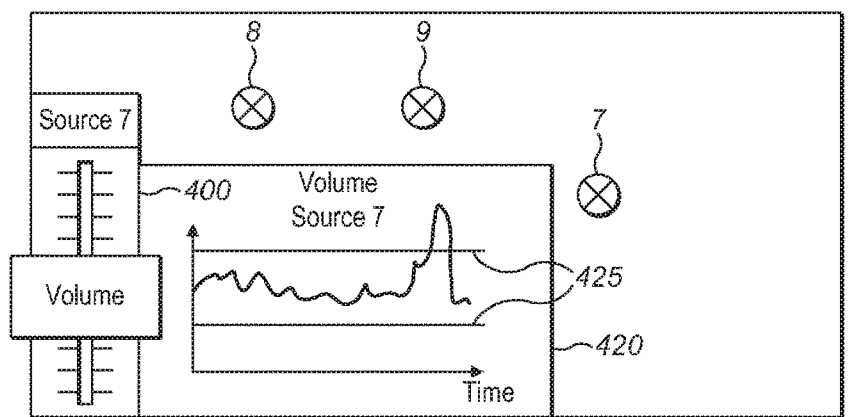

The controller unit may be provided for each audio source for controlling the parameters of the audio signals relevant to the processes of capture, mixing and rendering. As shown in FIGS. 4a-4c, the UI 16 may assume the form of a plan view of a real world space 3 indicating the positions of audio sources with symbols or images representing each performer or source of sound (7 to 13 in FIG. 1). The controller unit may be made visible to the mixing person, for example, when the mixing person 21 clicks, touches on or otherwise interacts with one or more symbols or images of the audio sources. The controller unit may then be generated near the position of the chosen audio source.

In the example shown in FIG. 4a, the mixing person clicks the audio source 7, corresponding to the lead vocalist, and a controller unit 400 is displayed near or adjacent to the audio source 7 in the UI 16. In this example, the controller unit 400 is a slide bar to control the volume of the lead vocalist 7. The UI 16 may enable the mixing person to determine the type of controller unit to be displayed. For example, the controller unit 400 may initially display a drop-down menu from which the mixing person can choose the parameter to control such as reverb, delay, volume, compression, distortion, overdrive, equalisation, pitch, spatial position, dialogue, lyrics, or musical phrase, although not limited to these examples. The controller unit 400 may then subsequently generate an interface which allows the mixing person to control the corresponding parameter. The controller unit 400 may be in the form of a slide bar, a knob, a graph, or any form of input interface which can receive user input to control the corresponding parameter.

Although it is described above that the controller unit is described as being displayed adjacent to or near to the audio source 7 being controlled, the controller unit 400 may be generated at any position within UI 16. The association of each controller unit 400 and the corresponding audio source 7 to 13 can be indicated, for example, by being connected with a line or being shown in similar colours, although not limited to these examples. In the example of FIG. 4b, when the mixing person clicks the audio source 7 in UI 16, the controller unit 400 for controlling the volume of the audio source 7 appears on the left hand side of the view of the mixing person 21. A part, for example the top part 405 of the controller 400 is labelled 'Source 7' to represent that the controller unit 400 controls the audio signal from the audio source 7. FIG. 4b also shows an alternative embodiment, where a dotted line 410 connecting the controller unit 400 and the audio source 7 indicates that the controller unit 400 controls parameters of the audio signal from the audio source 7.

Alternatively, the controller 400 may be always available to be visible in one or more parts of the UI, for example, in the form of a conventional sound console with an array of knobs and slide bars. Each controller unit 400 in this case may be labelled such that it is evident to the mixing person which audio source is controlled by the respective controller unit 400. For example, when the mixing person touches, clicks or otherwise interacts with one of the controller units in an array of the controller units, the corresponding audio source in UI 16 can be highlighted and vice versa. However, the implementation is not limited to these examples. A skilled person will know how to modify the user interface as necessary depending on applications.

Referring to FIG. 4c, the controller unit 400 may also include a display portion 420 that displays or visualises the audio properties of the audio signals, such as pitch, sound waveform, spectrum, or graph showing the statistics regarding the sound waveform, script of the dialogue or lyrics, although not limited to these examples. The display portion 420 of the controller unit 400 may also display or visualise relevant control parameters, status of each control parameter, or statistics regarding the location of the audio source 7 to 13. The display portion 420 of the controller unit 400 may also display or visualise performance characteristics, which are target values and standards and acceptable ranges of audio parameters, determined prior to the mixing stage. The performance characteristics will be discussed in more detail later. One of such display portions 420 may be shared by a plurality of controller units 400 when the display is capable of separately displaying parameters or properties from multiple audio sources. In the example shown in FIG. 4c, the controller unit 400 includes a display portion 420 which displays the time trajectory of the volume of the audio source 7. The display portion 420 also shows two horizontal bars 425, which set the acceptable range of the volume as determined in the performance characteristics. When the volume of the audio source 7 falls outside the range represented by these two horizontal bars, the software application 40 will detect that the parameter of the volume of the audio source 7 deviates from the normal or acceptable level of the performance characteristics, as will be discussed in more detail below.

The settings or parameters input at the controller unit 400 may affect the capture, mixing and rendering of the audio sources until the input parameters are modified, or until an automated program is in effect for changing the input value to the controller unit 400.

The software application 40 may be configured to generate a controller unit 400 for controlling a group of associated audio sources. For example, referring to FIG. 1, the choir members 11 to 13 are spatially close to one another and may be identified in UI 16 as a group, for example, by selecting them by dragging the cursor to enclose an area that contains the audio source 11 to 13, or in any other way depending on the way of interacting with the audio sources. This may be desirable if the mixing person 21 wishes to control more than one audio source with the same set of control parameters.

The controller unit 400 may be configured such that the adjustment of parameters can be pre-programmed to be automated. For example, the cut-off frequency of a low-pass filter acting on an audio source 7 to 13 can be programmed to change with respect to the beat of the music being performed.

The controller unit 400 of an audio source 7 to 13 may be configured to accept input from the other audio sources 7 to 13 or the video sources. For example, the degree of compression of the audio signal from one audio source can be configured to be dependent on the volume of the audio signal from another audio source or to be dependent on the average brightness of the video signal.

Another example aspect of the mixing stage of software application 40 and UI 16 is enabling the mixing person 21 to define performance characteristics and detecting and reporting deviations of the signals from the audio source 7 to 13 from the performance characteristics that define a target performance or a standard. The performance characteristics may represent the requirements on one or more audio signals and one or more parameters of the audio signals determined prior to the mixing stage.

These performance characteristics may be in the form of numbers, a range of numbers, thresholds on the parameters of the audio signals or the audio sources, conditions which should be met by the audio signals or the audio sources 7 to 13, a script for dialogue in the form of an input for speech-to-text technology, or even a captured audio signal of a rehearsal. For example, the performance characteristics can define a requirement that the shape of the spectrum of the audio signals should not fall into a certain category of shapes such as an excessively sharp peak around a narrow range of frequency, which may signal a feedback phenomenon. The performance characteristics may include any requirement desired by the mixing person on the parameters of the audio source 7 to 13 as long as they can be formulated as inputs, commands or scripts suitable for the software application 40 and/or the operating system 38. Therefore, the performance characteristics are not limited to the examples described above.

The software application 40 or the operating system 38 may provide within the UI 16 a performance characteristics UI configured to receive the set of performance characteristics in the form of inputs, commands or scripts. The performance characteristics may be provided prior to the performance via the input interface 36. Alternatively, the performance characteristics can be set using the controller units 400. The performance characteristics may be stored in the memory 32 or RAM 34. The performance characteristics can be accessed by the operating system 38 or the software application 40 when the CRS 15 is operated. The operating system 38 or the software application 40 may also be configured to access a default set of performance characteristics stored in the memory 32 or RAM 34 in case no performance conditions were input prior to the mixing stage. These default values of performance characteristics may also be overridden by the mixing person 21 when the mixing person 21 may choose to operate CRS 15 to capture, mix and render without setting any performance characteristics.

The CRS 15 and/or the software application 40 and/or the operating system 38 may be arranged to trigger a deviation event only when the conditions defined in the performance characteristics are not met for a predetermined duration of time, say 100 ms. This may prevent the situation where the CRS 15 reacts to the performance too frequently and the mixing person is unnecessarily distracted.

Figure 5:
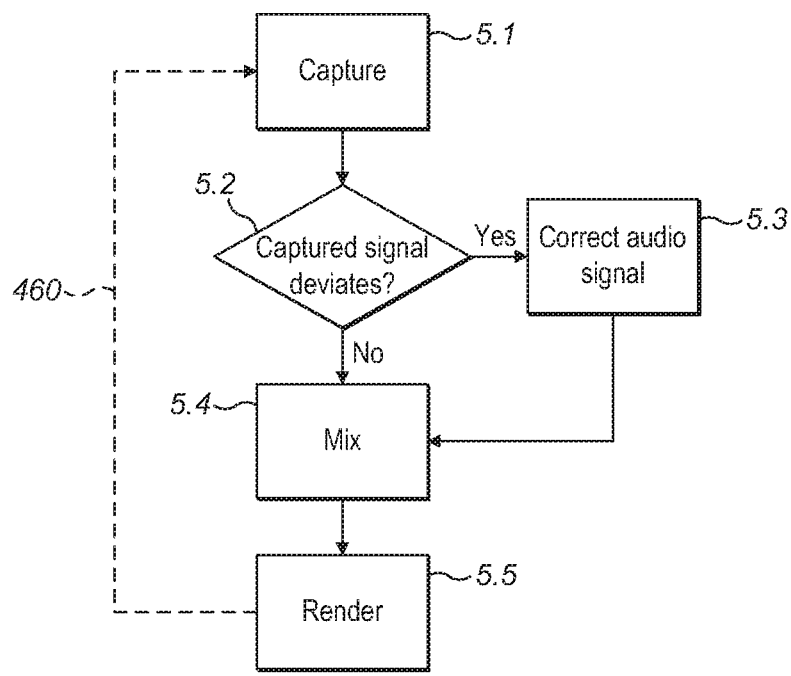
FIG. 5 is a flow diagram showing method steps of audio capture, correcting, mixing and rendering according to an embodiment.

FIG. 5 shows the processing steps performed by the CRS 15 through the software application 40. The capturing step 5.1 is followed by the step 5.2 of deciding whether the captured audio signal deviates from predetermined performance characteristics. If the captured audio signal does not deviate from the predetermined performance characteristics, the audio signal is mixed in step 5.4. If the captured audio signal deviates from the predetermined performance characteristics, the audio signal is corrected in step 5.3 and the corrected audio signal is mixed in step 5.4. Rendering takes place in step 5.5 in accordance with the mixing step 5.4. The feedback arrow 460 indicates that the steps 5.1-5.5 may be repeated over time. Step 5.3 for correcting the audio signal will be discussed in more detail below.

The deviations from performance characteristics may correspond to events such as falling out of pitch or tuning scale, presence of unwanted spurious audio phenomena such as clipping or feedback, presence of background noise, signal loss, excessive fluctuation in the location or behaviour of audio sources, and differences of dialogue or lyrics from a script or a rehearsal, although not limited to these examples.

Referring to FIGS. 6a and 6b, when a deviation from the performance characteristics is detected, the software application 40 may generate a correction controller unit 600 in the UI 16 for the audio source from which the abnormality or the deviation was detected. Analogous to the controller unit 400 discussed above, which is alternatively referred to as a normal or standard controller unit, the correction controller unit 600 may be either generated at a position close to the symbol or image representing the relevant audio source 7 to 13 in the plan-view of UI 16 or the correction controller unit 600 may be labelled to clearly indicate which audio source it is assigned to control. The correction controller unit 600 may enable the mixing person 21 to correct the parameters of the audio signal as defined by the performance characteristics.

Referring to FIG. 6a, when a standard controller unit 500 and a correction controller unit 600 are displayed side by side, the correction controller unit 600 may have identical form and function to the standard controller unit 500 but be differentiated in appearance, for example by using a different colour, to distinguish between them. The correction controller unit 600 may include a display portion 620.

Referring again to FIG. 6a, when a deviation from an audio source 7 to 13 is detected, if the standard controller unit 500 for the audio source was already open, the correction controller unit 600 may be generated near or adjacent to the controller unit 500 such that they can be compared side by side. If the controller unit for the audio source was not already open, the correction controller unit 600 may be generated along with the standard controller unit 500 simultaneously and near or adjacent to the standard controller unit 500 such that they can be compared side by side. The generated standard controller unit 500 and the correction controller unit 600 may share the display portion 620 such that the comparison on the part of the mixing person 21 is more intuitive. Having the standard controller unit 500 visible while adjusting the correction controller unit 600 may assist the mixing person to consider the value set in the standard controller unit 500 such that discontinuity or disturbance of performance is minimised.

FIG. 6a shows an example where the controller unit 500 to control the volume of the audio source 7 is already open before a deviation from the performance characteristics is detected by the software application 40. When a deviation in the volume of the audio source 7 is detected, the correction controller unit 600 is generated nearby the controller unit 500. In the example of FIG. 6b, the display parts 520 and 620 are combined. Furthermore, the standard display is altered to show normal and correction sliders 500, 600 on either side of a central scale.

The correction controller unit 600 may be in effect only during the period in which a deviation of the audio parameter from the performance characteristics persists. Any changes made with the correction controller unit 500 may be in effect only during this period. Alternatively, any changes made with the controller unit 500 during this period may be in effect even after this period until further input from the mixing person.

The correction controller unit 600 may disappear as soon as the parameters of the parameters of the audio signal return as defined in the performance characteristics. When the correction controller unit 600 disappears, the parameters of the audio signals 7 to 13 may return to the value set in the controller unit 500. Alternatively, as soon as the parameters of the audio signals are adjusted at the correction controller unit 600 to be within the acceptable range or setting defined in the performance characteristics, the correction controller unit 600 may change into a controller unit 500 and the parameters of the audio signals may be immediately transferred to the controller unit 500 such that the mixing person can keep on adjusting it without causing any discontinuities. Alternatively, the controller unit 500 may be configured to reproduce the behaviour of the correction controller unit 600 as soon as the parameter is adjusted at the correction controller unit 600 to be within the range or to satisfy the condition defined by the performance characteristics.

Alternatively, when the correction controller unit 600 is controlled with the tactile interface 28, the correction controller unit 600 may be in effect until the mixing person releases the tactile pressure, regardless of the duration of the period in which a deviation persists. The specific mode of transition of effect from the correction controller unit to the standard controller unit around the period during which a deviation persists is not limited to these examples. A skilled person would be able to adjust as necessary depending on the application.

Figure 7:
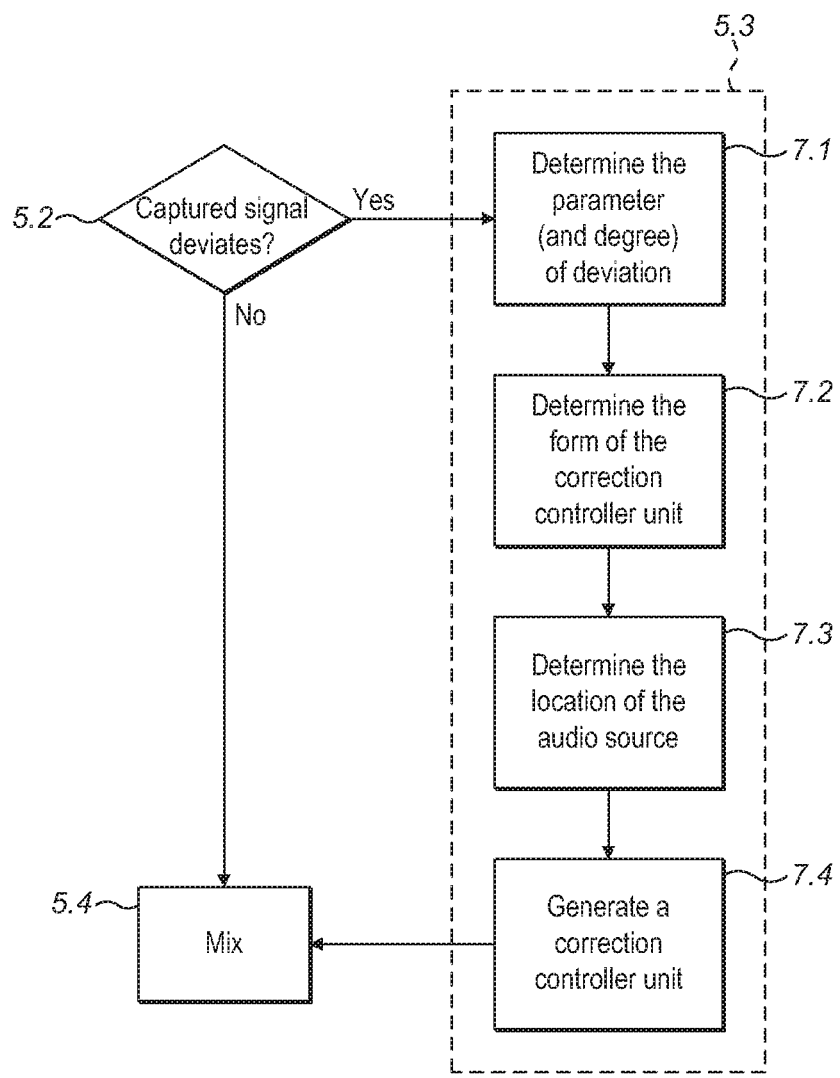
FIG. 7 is a flow diagram showing method steps of correcting in FIG. 5 according to an embodiment.

FIG. 7 shows the detailed processing steps performed by the CRS 15 through the software application 40 for step 5.3 of FIG. 5, correcting with the correction controller unit. When a deviation is detected in step 5.2, the type of deviation may be determined by referring to the specific parameters designated in the performance characteristics in step 7.1. If the performance characteristics are easily quantifiable, such as a range of numbers, the degree of deviation may also be determined in step 7.1. In step 7.2, the software application 40 may determine the suitable form of the correction controller unit 600 which contains necessary components to correct the indicated parameter(s) determined in step 7.1. Then in step 7.3, the software application 40 determines the location of the determined audio source in the plan view of the UI 16. In step 7.4, the software application 40 may generate the correction controller unit 600 near or adjacent to the location of the audio source in the UI 16.

Depending on the setting, in step 7.4 the software application 40 may only take action to attract the attention of the mixing person by zooming into, blinking, or displaying a sign near or adjacent to the audio source first and wait for the mixing person to respond before generating the correction controller unit, as will be described below.

Some of the exemplary embodiments described so far relate to the cases where the correction controller unit 600 is generated when a deviation from the performance characteristics is detected. Alternatively, in the event of detecting a deviation, the operating system 38 or the software application 40 may modify UI 16 to attract the attention of the mixing person without immediately generating the correction controller units 600. The UI 16 may be zoomed into the area around the symbols or the images of one or more of the corresponding audio sources 7 to 13 in the plan view of UI 16. Alternatively, the symbols or the images of one or more of the corresponding audio sources 7 to 13 may be caused to blink when the correction controller unit is generated. Alternatively, an indicator may be shown near the symbols or the images of one or more of the corresponding audio sources when the correction controller unit is generated. The UI may indicate the degree of abnormality in case the kinds of the audio parameters are easily quantifiable by a number, such as the volume of an audio source. For example, the size of the exclamation mark to highlight the audio source with deviation can be proportional to the degree of deviation.

Figure 8A:
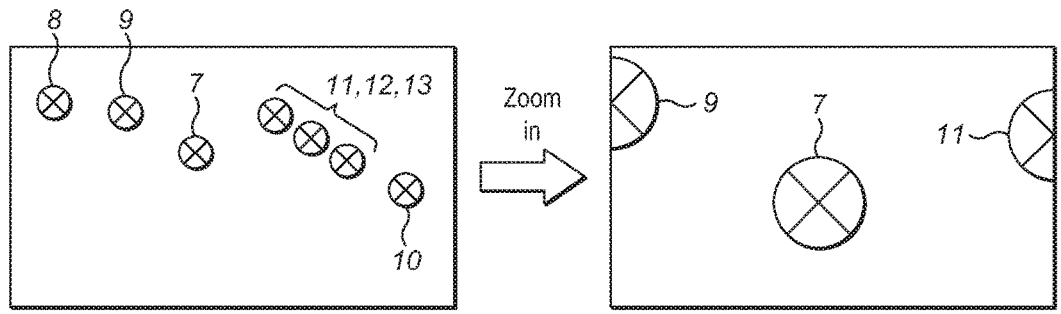
FIGS. 8a to 8c show graphical representations of a user interface (UI) indicating the locations of audio sources and modification of the user interface (UI) to indicate the audio sources from which an event of deviation is detected.
Figure 8B:
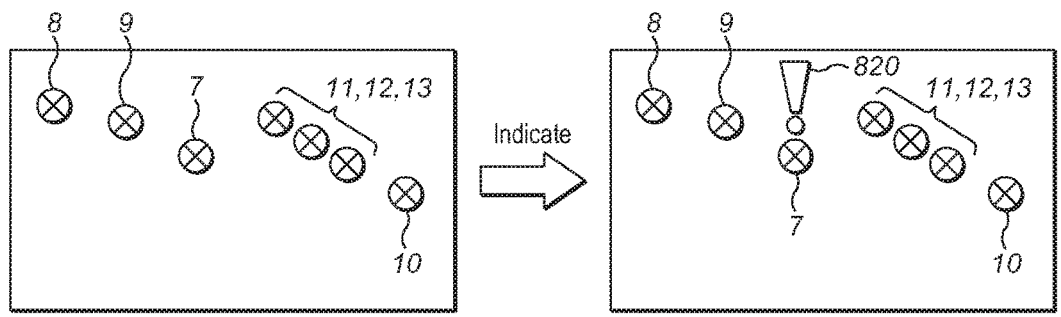
Figure 8C:
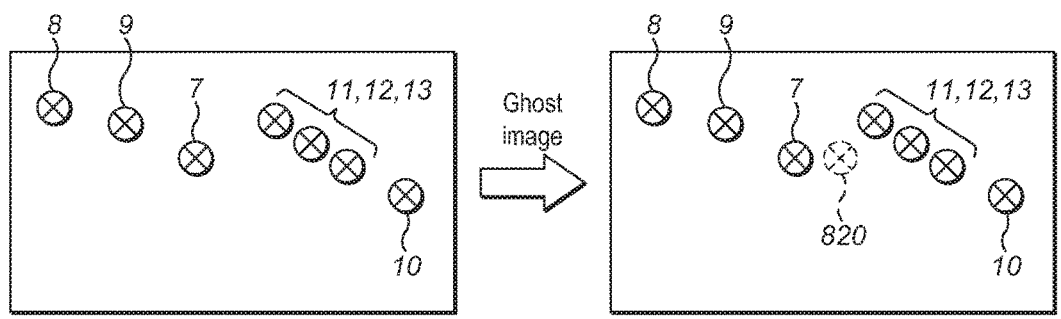

FIG. 8a shows an example where when a deviation is detected in the audio source 7, the UI 16 zooms into the audio source 7. In FIG. 8b, an exclamation mark 810 is shown near the audio source 7 to indicate that one or more parameters of audio source 7 deviated from the desired performance characteristics. In FIG. 8c, a ghost image 820 of the symbol or the image of the audio source 7 is displayed near or adjacent to the symbol or the image to indicate the same situation.

The mixing person can subsequently touch, click or otherwise interact with the symbol or the image of the audio source 7 to 13 indicated to have a deviation, to generate the correction controller unit 600 as shown in FIG. 6. This embodiment may assist the mixing person when a deviation is detected from two or more audio sources simultaneously, in which case multiple correction controller units 600 and/or controller units 400 can crowd the plan view of the UI 16. When more than one audio source is indicated to be subject to deviation, the mixing person can selectively generate a correction controller unit corresponding to a desired audio source 7 to 13 to work on. The situation where multiple events of deviations or abnormalities are detected will be discussed in more detail later.

Alternatively, after a predetermined period after the mixing person is alerted by the UI 16 regarding a deviation event, the operating system 38 or the software application 40 can be configured to generate a correction controller unit if the mixing person does not respond for a predetermined time period.

In the following description, some examples of deviation events and corresponding operation of CRS 15 are provided.

For example, the target pitch of the performance can be set to be exactly 440 Hz for the note A in the performance characteristics. However, a slightly higher or lower pitch may be set on the occasion of a performance by a concertmaster or a bandleader. In such case, the whole temperament of the musical scale shifts. The deviation of pitch may also occur when a performer introduces excessive tremolo or vibrato. The mixing person can define in the performance characteristics an acceptable range of pitch, for example, +−2 Hz around 440 Hz for the note A. When it is detected that the scales and notes of the audio source 7 fall outside this range during a performance, the mixing person is notified regarding the audio source and the audio parameter which deviated from the predetermined range ("7" and "pitch"), or the operating system 38 may generate a correction controller unit nearby the symbol or the image representing the audio sources such that the mixing person can correct the pitch of the audio source 7.

Figure 9:
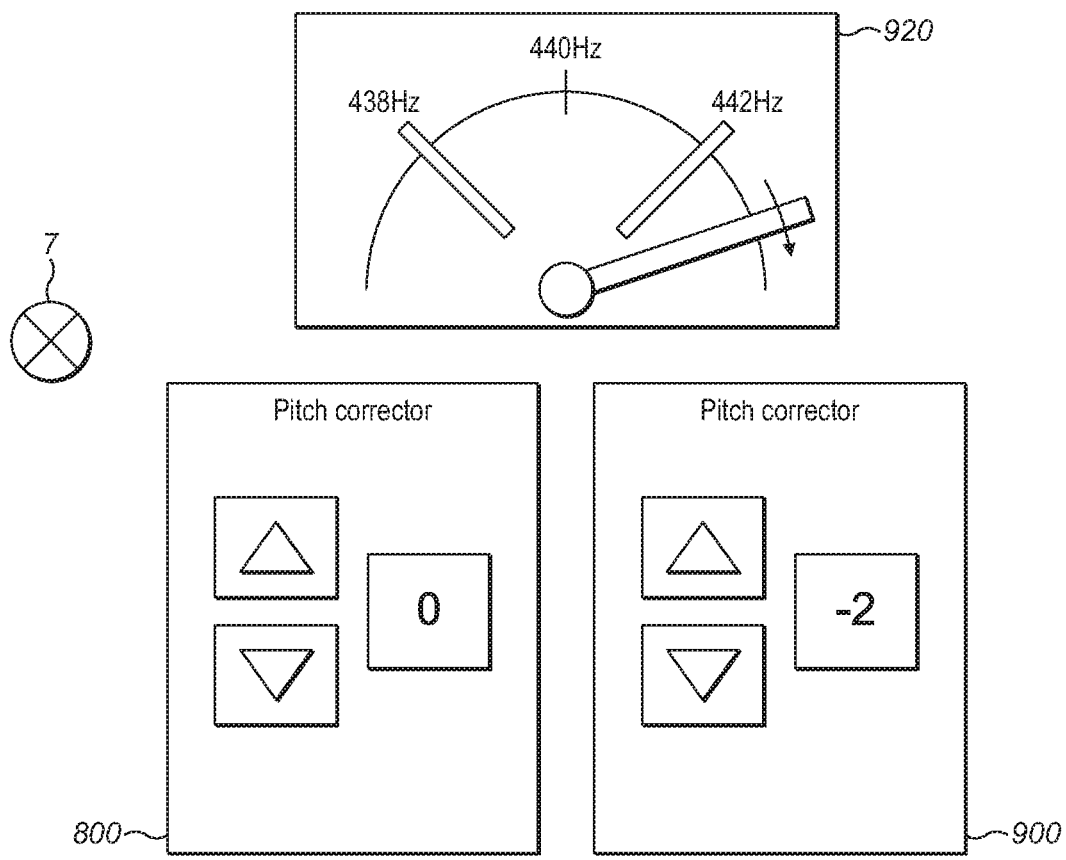
FIG. 9 is a graphical representation of a UI indicating an example of a correction controller unit customised for pitch correction.

FIG. 9 illustrates this example. As soon as a deviation of pitch is detected from the audio source 7, a correction controller unit 900 is generated adjacent to the audio source 7. The correction controller unit 900 can be tailored for pitch correction and can include a display portion 920 which shows the degree of deviation. The correction controller unit 900 can be generated along with the standard controller unit 800 for comparison. Pitch correction is set to be 0, for example, at the controller unit 800 for the case where the captured audio signal is mixed without pitch correction. The display portion 920 may show that the pitch of an A note is off by +3 Hz, for example, which exceeds the range defined in the performance characteristics. Then the mixing person 21 can choose to offset this value by adjusting the correction controller unit 900. As mentioned above, the correction controller unit 900 may also be automated to perform this task as soon as the deviation is detected or when the deviation persists for a predetermined time period. Alternatively, the correction controller unit 900 may also be configured to wait for the decision of the mixing person regarding whether a pre-programmed task of correction should be executed.

Similarly, the range of volume level of each audio source or whether the audio signal of each audio source is being clipped or distorted may also be set as performance characteristics. In this case, the correction controller unit can be customised to have elements of a sound compressor, expander or limiter.

Performance characteristics may be defined as to the shape of the audio spectrum in the frequency space. When an audio signal has excessive amplitude within a narrow range of frequency, this may be alerted to the mixing person as a source of feedback and suppressed using a correction controller unit. When a signal is detected within a predetermined frequency band known to correspond to the frequency band of unwanted source of noise, it may be monitored and suppressed with a correction controller unit. In this case, the correction controller unit can have the form of low-pass filter, high-pass filter, and band-pass filter. The display portion of the correction controller unit may have the form of a spectrum analyser.

FIG. 10 shows an example of correcting a deviation from the performance characteristics defined with respect to the audio spectrum. Performance characteristics may be defined for the presence of a signal within a predetermined frequency range. The predetermined frequency range may be known to the mixing person 21 to be a problematic range where howling, feedback or any other unwanted noise signal can occur due to the issues in hardware, structure of the venue and the like. For example, when the frequency range from the audio signal of a bass player is known to be around 500 Hz, a lead vocalist 2 KHz, and a guitar player 5 KHz, and it is known in advance that a howling can occur around 1.1 KHz prior to the performance, performance characteristics can be defined such that, for example, when a signal from the range of 1.1 KHz+−100 Hz is detected to be stronger than −5 dB from the audio signals from any of the audio sources, a deviation event will be triggered and a correction controller 1000 is generated. When the correction controller 1000 is generated, the display portion 1020 of the correction controller 1000 displays the spectrum indicating the problematic signal 1010 with an exclamation mark 1005. The correction controller 1000 may be pre-programmed by the mixing person 21 with a few options 1030, 1040, 1050, for example, corresponding to different bandwidths and depths of a notch filter. The mixing person 21 can choose one of these options according to the severity of the problematic signal 1010.

Another example aspect of the mixing stage of software application 40 is controlling how audio sources move, or change position, in the rendered virtual space responsive to detected movement in the captured real world space 3. In this respect, during capture it is sometimes the case that audio sources move. For example, in the FIG. 1 situation, any one of the audio sources 7-13 may move over time, as therefore will their respective audio position with respect to the capture device 6 and also to each other. Commonly, users may be used to static sources where the audio source is generally central. When audio sources move, the rendered result may be overwhelming and distracting. Therefore, an acceptable range of the movement of each audio source read by the HAIP tag may be included in the performance characteristics.

For another example, the positions of the performers can be recorded during a rehearsal and performance characteristics defining the acceptable range of movement of the audio sources can be defined in the performance characteristics based on this record. During the live event, the positions of the performers may be monitored and if there is a deviation, a correction controller unit may be generated. Using the correction controller unit, the mixing person 21 may silence the audio source which deviated from the performance characteristics, for example. Alternatively, the mixing person using the correction controller unit may control the position or the directionality of the sound while the deviation event persists. For example, the sound may be made ambient by removing the directionality while the deviation event lasts.

Figure 11A:
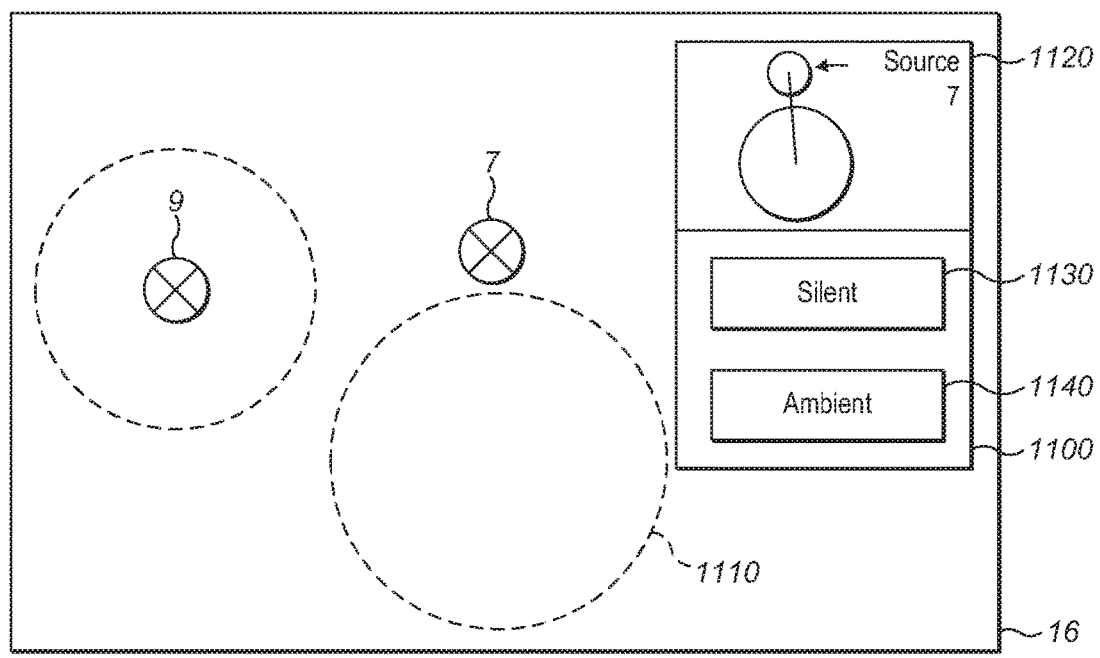
FIGS. 11a and 11b are graphical representations of a UI indicating examples of correction controller units customised for correcting position deviation of an audio source.

FIG. 11a illustrates this example. In the performance characteristics, acceptable area of movement of each audio source 7 to 9 may be defined. The acceptable area of movement may be made visible in UI 16 as an area 1110. If the audio source 7, corresponding to the lead vocalist, deviates from this area defined in the performance characteristics, a correction controller unit 1100 is generated adjacent to the audio source 7. The display portion 1120 of the correction controller unit shows the position of the audio source 7 with respect to the acceptable area of movement of the audio source 7 defined in the performance characteristics. The mixing person 21 can choose to either silence the audio source 7 by clicking on a first area 1130 or remove the directionality from the audio signal of the audio source 7 such that the listener perceives it as ambient, by clicking on a second area 1140.

For another example, the performance characteristics may be defined with respect to fluctuations or degree of noise in the detected positions of the audio source 7 to 13. The fluctuation or noise in the detected positions of the audio source may originate from actual movement of each performer, imperfections in communication between HAIP tags and the HAIP locator 20, or unexpected error within the processing of the HAIP locator 20, although not limited to these examples. When the positions of the audio sources 7 to 13 move with excessive degree of noise or fluctuation, the rendered result may be overwhelming and distracting to the listeners. The listening experience may be improved by processing the position of each audio source 7 to 13 before mixing and rendering process.

Two examples will be presented regarding how the degree of fluctuation or noise in the detected positions may be defined in the performance characteristics.

Figure 11B:
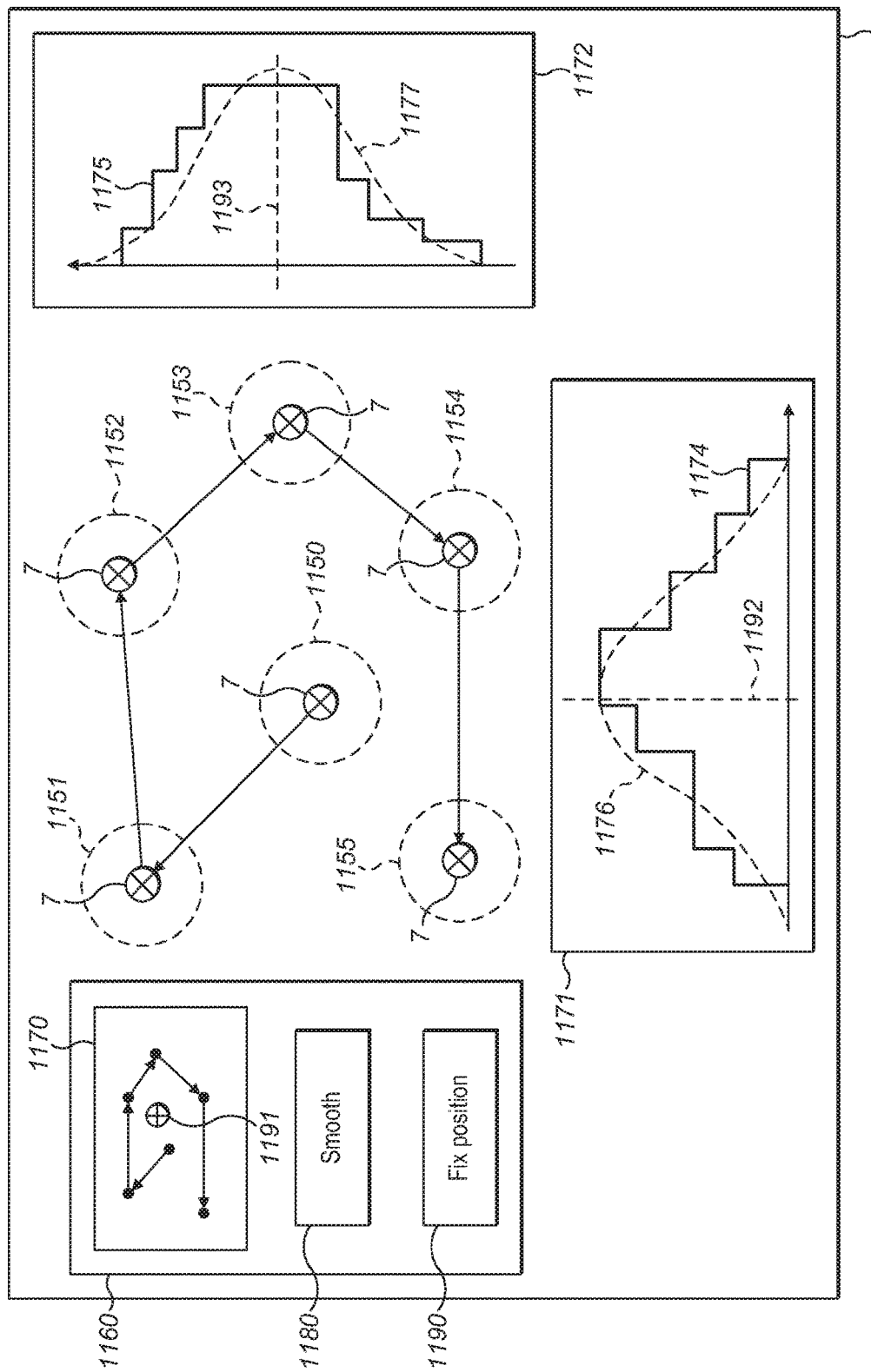

In case movements of the audio sources are expected to comprise a sequence of discrete movements, the performance characteristics may be defined by, for example, defining a characteristic area with minimum radius, a minimum time period of stay within that characteristic area, and a threshold frequency of occurrence of the movements. FIG. 11b describes an example for such a case. In the performance characteristics, a characteristic area 1150 of the audio source 7 may be defined to be a circle with, for example, 1 meter radius. When the audio source 7 moves away from the initial characteristic area, a new characteristic area 1151 may be defined at the new position. The minimum time period of stay in the characteristic area may be defined to be, for example, 1 s. The threshold frequency of occurrence may be defined to be, for example, 3 movements within 10 seconds, above which a deviation is determined. FIG. 11b describes a situation where the audio source 7 changes position by a distance larger than the radius of the characteristic area 1150 without staying longer than 1 s in each characteristic area, as often as 5 times within, for example, 10 seconds (1150 to 1155). Since this exceeds the threshold frequency defined in the performance characteristics, a correction controller 1160 may be generated by the software application 40. The display portion 1170 of the correction controller 1160 may display the position trajectory of the audio source 7 within the last 10 seconds.

In case the movements of the audio sources are expected to be continuous in time, the performance characteristics may be defined with respect to statistics in the distribution of the position detected and accumulated within a certain time period. As shown in FIG. 11b, display portions 1171 and 1172 may be displayed as an alternative to the display portion 1170. The display portions 1171 and 1172 display the distributions of the positions of the audio source 7, 1174 and 1175, respectively, accumulated over a time interval predetermined by the mixing person 21, for example, 10 seconds. These position distributions 1174 and 1175 may be refreshed every predetermined time interval or alternatively refreshed at a shorter or longer time interval than the predetermined time interval. The software application 40 may be configured to evaluate statistics of the position distributions 1174 and 1175. For example, the fluctuation of position of the audio source 7 may be assumed to be random by the mixing person 21, and a Gaussian distribution may be used by the software application 40 to fit the position distributions 1174 and 1175. The performance characteristics in this case setting the threshold of noise or fluctuation of the position of the audio source 7 may be defined as the maximum allowable width of these distributions. When the width of one of the fitted Gaussian distributions exceeds a certain threshold, this event may be detected by the software application 40 as an abnormality or a deviation.

When a deviation is detected with respect to the fluctuation or noise in the positions of any of the audio sources, a correction controller 1160 may be generated.

The mixing person 21 may click, touch or otherwise interact with the button 1180 to smooth the movement of the audio source 7. The smoothing function 1180 may be time averaging of the position of the audio source 7. For example, the average position of the trajectory of the past 3 seconds may be evaluated by the software application 40 and for the purpose of the mixing and rendering, the position of the audio source 7 may be designated to be that average position. This way, the listener would feel that the audio source 7 is more stable in position. In case of post-production, the mixing person 21 may decide on the time interval in which the position of a specific audio source may be time-averaged. In case of live performance, the smoothing function 1180 may persist for a duration predetermined by the mixing person 21, or in case the correction controller 1160 is controlled via a tactile interface, the smoothing function 1180 may persist as long as the mixing person 21 maintains the touch. The implementations regarding the duration of the smoothing function 1180 are not limited to these examples.

Alternatively, the smoothing function 1180 may evaluate the time-averaged position of the audio source 7 from the fitted distribution curves 1176 and 1177. For example, the mean of the fitted distribution curves 1176 and 1177 may be defined to be the time-averaged position of the audio source 7. However, the exact algorithm of smoothing function 1180 may not be limited to time averaging or using fitted curves of the position distributions.

Alternative to the smoothing function 1180, the mixing person 21 may choose to click, touch or otherwise interact with the position fixing function 1190. For example, this option may provide a position fixing UI 1191 within the display portion 1170, as shown in FIG. 11*b*. The position fixing UI 1191 may enable the user to designate a specific position of the audio source 7 within the plan view of UI 16, which may be used for the mixing and rendering process. For example, this may be done by dragging the position fixing UI 1191 to a desired position. In the display portions 1171 and 1172 which show the position distributions, the position fixing UIs 1192 and 1193 may be provided as markers to designate desired positions of the audio source 7. For example, the marker 1192, 1193 may be a draggable line for indicating the desired position.

A deviation or an abnormality may also occur in terms of positions of the audio source 7 to 13 when the detected signal from a given HAIP tag attached to respective ones of the audio sources is too weak to determine their positions. The performance characteristics may define a minimum threshold of signal amplitude of HAIP tag. In the event of such a deviation, a correction controller may be generated to give the mixing person 21 suitable options such as to make the sound ambient, or to specify a desired position in the plan view of UI 16.

Another example aspect of the mixing stage of the software application 40 is controlling one or more of the audio sources 7 to 13 such that when a certain time interval of an audio signal deviates from the performance characteristics, a back-up audio signal can be "punched in." In other words, the mixing person 21 may fade out the audio signal which deviated from the performance characteristics while fading in a pre-stored substitute audio signal into the channel for the audio source for mixing. The performance characteristics can be captured audio signals from a rehearsal, or a script in a machine readable form, for example, compatible with speech-to-text technology, in the case where the parameter of the audio source is the dialogue of a person or lyrics of a song. The performance characteristics may also be defined such that predetermined intervals of the received audio signals can be compared with the corresponding time interval in the pre-stored audio source defined in the performance characteristics. When it is decided that the captured audio signal of an audio source deviates from the performance characteristic, a correction controller is generated. The correction controller may comprise control elements to cross fade the captured audio signal and the stored audio signal from the performance characteristics. The correction controller may further comprise a display portion to display the detected dialogue or words of a song in the captured audio signal in comparison with the detected dialogue or words in the rehearsal audio signal or in the script. In case the parameter of the audio source of interest is a musical performance without words or lyrics, the waveforms of the musical performances may be shown in the display portion of the correction controller.

Figure 12:
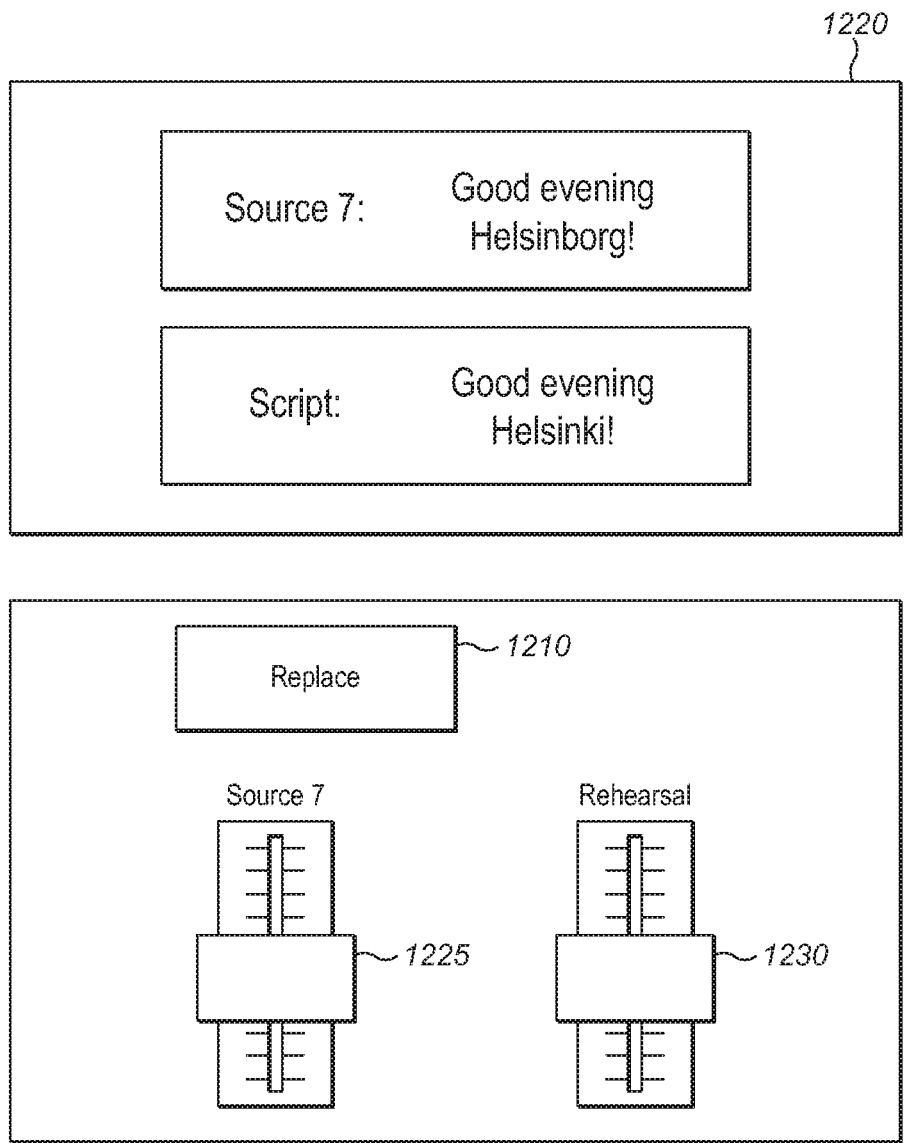
FIG. 12 is a graphical representation of a UI indicating an example of a correction controller unit customised for correcting misspoken lines of dialogue of an audio source.

FIG. 12 illustrates an example of this aspect. The speech-to-text technology function may be equipped in the software application 40, and the text analysed from the captured audio source from a lead vocalist is "Good morning Helsingborg!" while the line in the script is "Good morning Helsinki!" If the performance characteristic has been defined with a script of the dialogue of the lead vocalist, and a discrepancy between the two texts is detected by the software application 40, in this case "Helsingborg" and "Helsinki," then the software application 40 may generate a correction controller 1200. The display portion 1220 may display the recognised text from the audio signals and the text from the script. The mixing person 21 can simply choose to replace this interval of audio signal with the pre-stored audio source performed according to the script, for example during a rehearsal, by clicking, touching or otherwise interacting with the interface 1210. The interface 1210 may be configured with pre-stored settings of exchanging two clips of audio sources, such as the time constant of cross fading and the ratio of minimum and maximum volume, although not limited to these properties. Alternatively, the mixing person 21 can use first and second slide bars 1220, 1230 for controlling the captured audio signal and the pre-stored audio signal, respectively for crossfading. Two slide bars 1225, 1230 may be coupled to each other in a predetermined setting such that the mixing person 21 can adjust only one of the two slide bars for a crossfading operation. For example, it can be arranged that the sum of the volume of the two slide bars is conserved. When the first slide bar 1225 is increased, the second slide bar 1230 can decrease in response to the first slide bar 1225. Working with two slide bars may be useful in exchanging audio clips with minimum discontinuity when the mixing person 21 is working on a post-production of a captured audio source. In case of a live performance where there is little time for the mixing person 21 to react, an interface 1210 may be automated to be executed.

Based on pre-stored audio signals from a performance according to the script, for example audio signals recorded during a rehearsal, the software application 40 may be configured to predict deviation or abnormality event or pre-emptively generate a correction controller during a live performance. For example, during a rehearsal, it could have been found out that the HAIP tag signal provides erroneously noisy signal for the audio source 8 for the drummer, farthest from the HAIP locator 20 in the stage. The software application 40 may be configured to predict the possible deviation and enquire of the mixing person 21 regarding whether to generate a correction controller, for example 1160 from FIG. 11b, near the audio source 8 before a live performance. For another example, if during the rehearsal one of the background singers 11, 12, 13 sang out of pitch at a certain phrase of a song, then the software application 40 may be configured to alert the mixing person 21 with a messaging UI or by generating a correction controller preemptively when the live performance draws near the phrase of the song.

The embodiments described so far mainly relate to a single deviation or abnormality event within one audio source. However, during a live performance or post processing of a recorded performance, the mixing person 21 may have to deal with multiple events of deviation or abnormality. For example, simultaneously at the audio source 7, corresponding to the lead vocalist, there may occur a pitch deviation, as described in FIG. 9, a position deviation detected by a HAIP tag, as described in FIG. 11a, and a deviation of words from the rehearsed script, as described in FIG. 12. At the same time, the volume level of one of the backing singers 11 may be lower than the threshold defined in the performance characteristics, and there may be a feedback phenomenon detected in the channel of the lead guitarist 9. In such a case, the mixing person 21 may have to prioritise the tasks, especially in a live performance situation.

The software application 40 may be configured such that the mixing person 21 may define priority characteristics, which define a detailed order of priority in being notified of the deviation events, and in generation of the correction controllers. This aspect of the software application 40 will be detailed below.

Within the priority characteristics, the mixing person 21 may be able to assign a degree of priority to each audio parameter belonging to respective ones of the audio sources 7 to 13, prior to the mixing stage. In the example shown in FIG. 13a, all of the audio parameters belonging to the lead vocalist, which are pitch, position, and script, may be set by the mixing person 21 to be of higher priority than the other audio parameters being considered such as the volume level of the backing singer 11. Among the audio parameters belonging to the lead vocalist, the priority of the pitch may be set as the highest, and the priority for the position and the script may be set to be the same but lower than that of the pitch, for example. All of the audio parameters of the lead guitarist 9 may be set to be lower in priority than those of the audio parameters of all the other audio sources. Some of the audio parameters may be set to be universally of high priority. For example, the deviation event where a feedback signal is detected may be set to be equally highest priority in all audio sources. As with the performance characteristics, the priority characteristics may be set using a priority characteristics UI provided by the software application 40 or the operating system 38. The priority characteristics UI may be configured to receive the order of priority of each audio parameter of respective ones of the audio sources 7 to 13 as number input from the mixing person 21, according to a predetermined number scale, or rearrangement by the mixing person 21 of sub-UIs in the form of symbols or images within the priority characteristics UI representing each audio parameter in a desired sequence, for example. However, the exact format of the priority characteristics UI is not limited to these examples. Alternatively, the priority characteristics may be set using the normal or standard controller units belonging to each audio source.

Separate priority characteristics may be defined for each individual section of a performance such as sections of a song, a movie, or a concert. For example, an audio source with a dominant role may vary for each section of a performance, such as a lead vocalist, a lead instrument, or a main actor. These dominant audio sources may be defined to be of higher priority over the other audio sources in the priority characteristics. In the post-processing case, the software application may be configured to determine the dominant audio source in a given time point and to suggest them as default option to the mixing person 21 in the priority characteristics UI.

In case there are multiple deviation events of the same audio parameter from more than one audio sources, the priority characteristics UI may be configured such that the degree of deviation is automatically reflected in the priority order. For example, if two of the backing singers 11 and 13 both sang out of pitch, the backing singer who sang more out of pitch than the other may be set to be of higher priority if the priority order set by the mixing person 21 for the two channels were otherwise the same.

As with the performance characteristics, the priority characteristics may be stored in the memory 32 or RAM 34, and may be accessed by the operating system 38 or the software application 40 when the CRS 15 is operated. The operating system 38 or the software application 40 may also be configured to access a default set of priority characteristics stored in the memory 32 or RAM 34 in case no priority order information were input prior to the mixing stage.

Figure 13A:
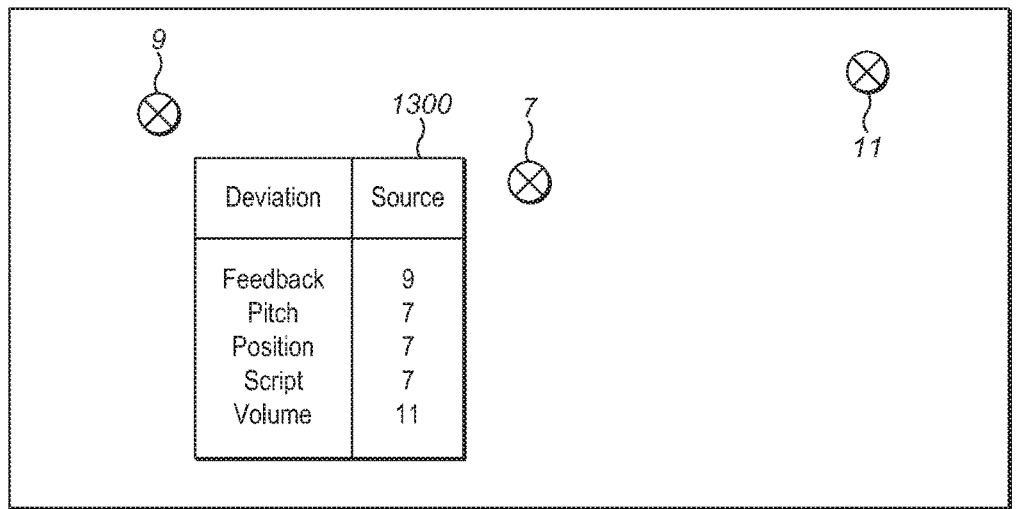
FIGS. 13a and 13b show examples of deviation notification UIs where there are multiple deviation events detected.

FIG. 13a shows an example of a deviation notification UI 1300 in case there are multiple deviation events detected. Since the priority of the deviation events of a feedback signal in any audio source channel is set to be highest priority, the feedback signal detected in the channel of the lead guitarist 9 is positioned on top of the deviation notification UI 1300. Then the deviation detected from the lead vocalist 7 is listed with the pitch prioritised over the position and the script. Then the deviation event detected from one of the backing singers 11 is listed in the deviation notification UI 1300. Looking at the deviation notification UI 1300, the mixing person 21 may be able to prioritise the task following the order of list of deviation events.

Figure 13B:
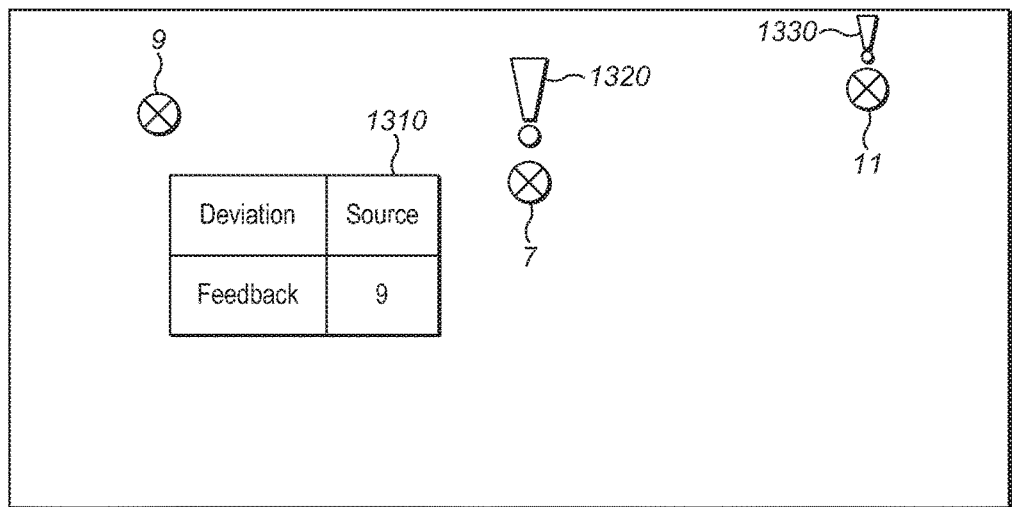

FIG. 13b shows an example of an alternative embodiment of the deviation notification UI. The deviation notification UI 1310 shows only the feedback phenomenon in the audio channel of the lead guitarist 9, which is prioritised the highest in the priority characteristics. Near the lead vocalist 7 and the backing singer 11, exclamation marks, 1320 and 1330, respectively, are generated to indicate that there are deviation events in the audio sources 7 and 11. The exclamation mark near the lead vocalist 7 is bigger than that of the backing singer 11 to indicate that the priority of deviation events of the audio source 7 is higher than that of the audio source 11. If the priority assignment in both channels were the same, the size of the exclamation mark, or any other indicator mentioned above in FIG. 8, may signal the degree of deviation, for example the number of deviation events or the degree of deviation in case the type of deviation of any given audio sources is the same.

The software application 40 may generate the deviation notification UI 1310 corresponding to the audio source 9 which has the deviation event with the highest priority. However, at any point, the mixing person 21 may click, touch or otherwise interact with the symbol or image of other audio sources or the exclamation marks, or any indicators, near the audio sources 7 to generate another deviation notification UI which shows the details of the deviation events to the chosen audio source. Alternatively, the software application 40 may be configured such that when the deviation event displayed in the deviation notification UI ceases to persist, the next deviation event in the order of priority is displayed in the deviation notification UI.

Implementations of displaying the deviation event according to the order defined in the priority characteristics are not limited to these examples. A skilled person will know how to configure the software application 40 depending on the application such that the mixing person 21 can cope with the multiple deviation events in an efficient manner.

Figure 14A:
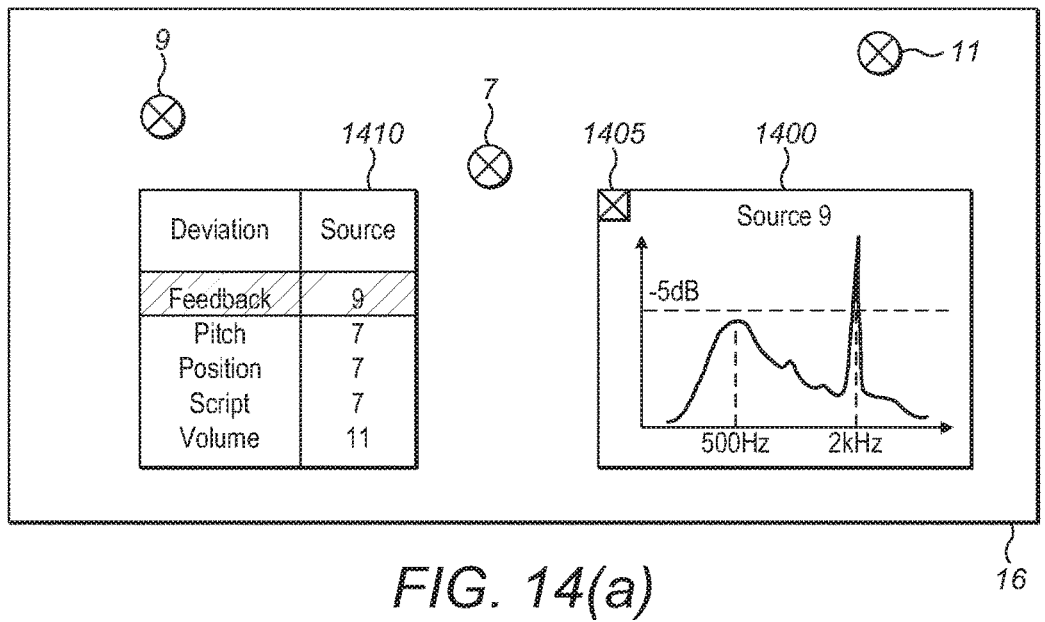
FIGS. 14a and 14b show examples of generating correction controllers 1400 in case multiple deviation events occur simultaneously.
Figure 14B:
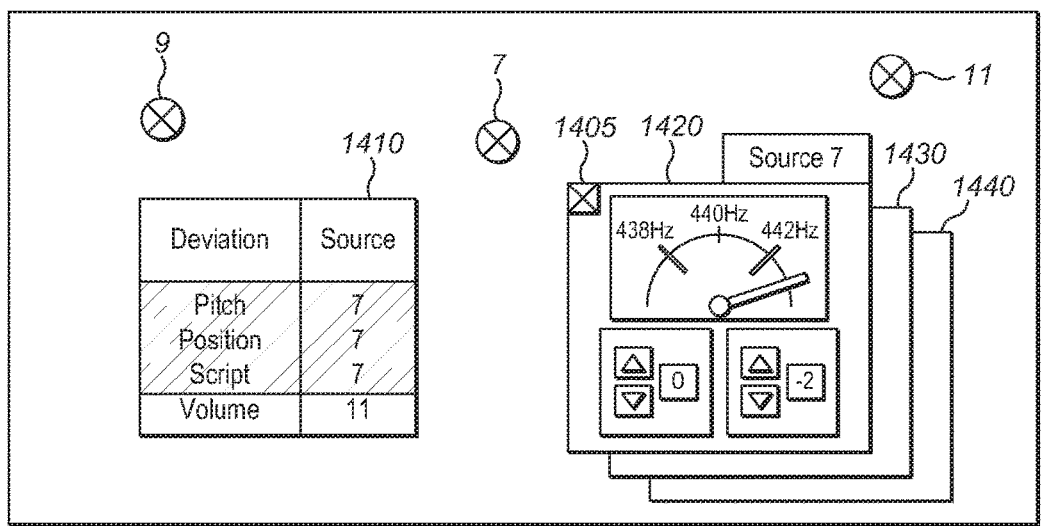

FIGS. 14a and 14b shows example embodiments of generating correction controllers in case multiple deviation events occur simultaneously. The software application 40 may be configured to automatically generate a correction controller corresponding to the deviation event of highest priority. Alternatively, the software application 40 may be configured to generate a correction controller when the mixing person 21 touches, clicks or otherwise interacts with one of the entries of the deviation events displayed in the deviation notification UI.

FIG. 14a shows a situation where the correction controller 1400 for the feedback signal is displayed either automatically or by the mixing person 21 interacting with the first deviation event, feedback in source 9, displayed in the deviation notification UI 1410. The correction controller 1400 may be configured to disappear as soon as the deviation event is removed, or may be configured to disappear only on the command of the mixing person 21, for example, touching, clicking or otherwise interacting with the close icon 1405.

The correction controller corresponding to the next deviation event displayed in the deviation notification UI 1410 may be configured to appear automatically after the correction controller 1400. Alternatively, the correction controller corresponding to the next deviation event displayed in the deviation notification UI 1410 may be configured to appear only when the mixing person 21 touches, clicks or otherwise interacts with one of the entries of the deviation events displayed in the deviation notification UI 1410.

FIG. 14b shows a situation in which the deviation event regarding the feedback signal is corrected. In this example, the correction controllers 1420, 1430, 1440 corresponding to the pitch, position, and script, respectively may appear simultaneously. The correction controllers 1420, 1430, 1440 may have appear automatically as soon as the feedback signal is corrected or when the mixing person touches, clicks or otherwise interacts with the deviation events of the audio source 7. The software application 40 may be configured such that all of the correction controllers corresponding to the same audio source, in the example the audio source 7, may appear simultaneously. This may be helpful in a situation where manipulating multiple audio parameters at the same time may be necessary. For example, altering one audio parameter of an audio source may affect the other audio parameter of the same audio source.

Alternatively, all of the correction controllers corresponding to respective ones of the deviation events displayed in the deviation notification UI 1410 may be configured to appear simultaneously.

At any point in time, the mixing person 21 may touch, click or otherwise interact with any of the audio sources to generate a normal controller or a correction controller in case there is a deviation event associated with the audio source. For example, an indicator 1430 near the background singer 11 or the symbol or the image of the audio source 11 itself may be touched, clicked or otherwise interacted with by the mixing person 21 to generate the correction controller corresponding to the pitch of the background singer, even if the deviation events of higher priority are not dealt with.

The correction controllers 1400, 1420, 1430, 1440 may enable the mixing person 21 to correct the deviation or abnormality situation manually. Alternatively, the correction controllers may be automated. In the priority characteristics, the mixing person 21 may designate audio parameters that may be automatically corrected by corresponding correction controllers. For example, the automatic correction may be set to the audio parameters with low priority or the degree of deviation smaller than a predetermined offset. For example, in all of the audio sources, when the pitch deviation from the performance characteristics is smaller than 0.5 Hz, it can be designated in either individual correction controllers or the priority characteristic to correct the pitch automatically. When the pitch deviation is larger than 0.5 Hz, the deviation event may be alerted to the mixing person 21. For another example, all of the audio parameters with low priority, for example, all of the audio parameters of the audio source 10 corresponding to the bass guitarist, may be defined in the priority characteristics to be corrected automatically without notifying the mixing person 21.

The sequence, layout or method of generating correction controllers with respect to the deviation events displayed in order of priority in the deviation notification UI are not limited to the examples described above. A skilled person will know to configure software application 40 depending on the specific application such that the mixing person 21 can cope with the multiple deviation events in an efficient manner.

It will be appreciated that the above described embodiments are purely illustrative and are not limiting on the scope. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Embodiments described herein may be implemented in software, hardware, application logic or a combination of software, hardware and application logic. The software, application logic and/or hardware may reside on memory, or any computer media. The application logic, software or instruction set may be maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to "computer-readable storage medium"/"computer program product" and "controller"/"processor"/"processing apparatus" should be understood to encompass not only computers having differing architectures such as single/multi-processor architectures and sequencers/parallel architectures, but also specialised circuits such as field programmable gate arrays FPGA, application specific circuits ASIC, signal processing devices and other devices.

The invention claimed is:

1. A method comprising:
    detecting a parameter relating to an audio source;
    determining if the parameter deviates from a predetermined characteristic; and
    in response to it being determined that the parameter deviates from the predetermined characteristic:
        causing display of a user interface configured to control the parameter;
        determining the spatial location of the audio source; and
        generating the user interface adjacent to the determined spatial location of the audio source within the display.

2. The method according to claim 1, wherein the spatial location of the audio source is caused to be displayed on a display, the method further comprising causing display of the user interface on the display in association with the audio source.

3. The method according to claim 1, wherein determining if the parameter deviates from the predetermined characteristic comprises determining if a level associated with the parameter falls outside a predetermined range.

4. The method according to claim 1,
    wherein determining if the parameter deviates from the predetermined characteristic comprises determining the presence of an unwanted signal associated with the audio source, the unwanted signal falling outside the predetermined range associated with the parameter, or
    wherein determining if the parameter deviates from the predetermined characteristic comprises determining if a difference is detected between text corresponding to a captured audio signal and a predetermined script, or
    wherein determining if the parameter deviates from the predetermined characteristic comprises determining if a difference is detected between the captured audio signal and an audio signal corresponding to a predetermined script.

5. The method according to claim 1, wherein the user interface comprises a control interface having first and second parts, the first part comprising a first control element for controlling a desired parameter level and the second part comprising a second control element for controlling the parameter when the parameter deviates from the predetermined characteristic.

6. The method according to claim 5, further comprising:
    causing display of the first control element in response to receipt of a signal indicative of a user interaction on a screen that displays the audio source and
    causing display of the second control element only in response to the parameter deviating from the predetermined characteristic.

7. The method according to claim 1, further comprising:
    in response to it being determined that the parameter deviates from the predetermined characteristic, determining the type of deviation; and
    generating a user interface that corresponds to the determined deviation type.

8. The method according to claim 1, further comprising:
    in response to determining that a location of the audio source deviates from a predetermined range of locations, generating a controller arranged to control the audio source, and optionally wherein controlling the audio source comprises one of silencing the audio source and removing the directionality of the audio source.

9. An apparatus comprising at least one processor, and at least one memory including computer program code, which when executed by the at least one processor, causes the apparatus to:
    detect a parameter relating to an audio source;
    determine if the parameter deviates from a predetermined characteristic; and
    in response to it being determined that the parameter deviates from the predetermined characteristic:
        cause display of a user interface configured to control the parameter;
        determine the spatial location of the audio source; and
        generate the user interface adjacent to the determined spatial location of the audio source within the display.

10. The apparatus according to claim 9,
    wherein the spatial location of the audio source is caused to be displayed on a display, and
    wherein at least one memory including computer program code, which when executed by the at least one processor, further causes the apparatus to: display of the user interface on the display in association with the audio source.

11. The apparatus according to claim 9, wherein determining if the parameter deviates from the predetermined characteristic comprises determining if a level associated with the parameter falls outside a predetermined range.

12. The apparatus according to claim 9,
    wherein determining if the parameter deviates from the predetermined characteristic comprises determine the presence of an unwanted signal associated with the audio source, the unwanted signal falling outside the predetermined range associated with the parameter, or
    wherein determining if the parameter deviates from the predetermined characteristic comprises determine if a difference is detected between text corresponding to a captured audio signal and a predetermined script, or
    wherein determining if the parameter deviates from the predetermined characteristic comprises determine if a difference is detected between the captured audio signal and an audio signal corresponding to a predetermined script.

13. The apparatus according to claim 9, wherein the user interface comprises a control interface having first and second parts, the first part comprising a first control element for controlling a desired parameter level and the second part comprising a second control element for controlling the parameter when the parameter deviates from the predetermined characteristic.

14. The apparatus according to claim 13, wherein at least one memory including computer program code, which when executed by the at least one processor, further causes the apparatus to:
    display of the first control element in response to receipt of a signal indicative of a user interaction on a screen that displays the audio source and cause display of the second control element only in response to the parameter deviating from the predetermined characteristic.

15. The apparatus according to claim 9, wherein at least one memory including computer program code, which when executed by the at least one processor, further causes the apparatus to:
   in response to it being determined that the parameter deviates from the predetermined characteristic, determine the type of deviation; and
   generate a user interface that corresponds to the determined deviation type.

16. The apparatus according to claim 9, wherein at least one memory including computer program code, which when executed by the at least one processor, further causes the apparatus to:
   in response to determining that a location of the audio source deviates from a predetermined range of locations, generate a controller arranged to control the audio source, and optionally wherein controlling the audio source comprises one of silencing the audio source and removing the directionality of the audio source.

17. The apparatus according to claim 9, wherein at least one memory including computer program code, which when executed by the at least one processor, further causes the apparatus to:
   detect a plurality of parameters relating to one or more audio sources; and
   determine if more than one of the plurality of parameters deviates from predetermined characteristics; and
   in response to it being determined that more than one of the plurality of parameters deviates from the predetermined characteristic, cause the parameters to be displayed in order of a predetermined priority.

18. A computer program product comprising one or more non-transitory computer-readable medium having computer-readable code stored thereon, the computer-readable code, when executed by at least one processor, causing performance of at least
   detect a parameter relating to an audio source;
   determine if the parameter deviates from a predetermined characteristic; and
   in response to it being determined that the parameter deviates from the predetermined characteristic:
      cause display of a user interface configured to control the parameter determine the spatial location of the audio source; and
      generate the user interface adjacent to the determined spatial location of the audio source within the display.

* * * * *